(12) United States Patent
Leclerc

(10) Patent No.: US 11,021,884 B2
(45) Date of Patent: Jun. 1, 2021

(54) DWELLING WITH SELECTIVELY ADJUSTABLE LIVING SPACES, AND CORRESPONDING METHODS ASSOCIATED THERETO

(71) Applicant: LES MODULES ÉCOLOGIQUES MOVE HOME INC., Quebec (CA)

(72) Inventor: Pierre Leclerc, Quebec (CA)

(73) Assignee: Les Modules Ecologiques Move Home Inc., Quebec (CA)

( * ) Notice: Subject to any disclaimer, the term of this patent is extended or adjusted under 35 U.S.C. 154(b) by 0 days.

(21) Appl. No.: 16/478,823

(22) PCT Filed: Jan. 18, 2018

(86) PCT No.: PCT/CA2018/050058
§ 371 (c)(1),
(2) Date: Jul. 17, 2019

(87) PCT Pub. No.: WO2018/132914
PCT Pub. Date: Jul. 26, 2018

(65) Prior Publication Data
US 2020/0056389 A1 Feb. 20, 2020

Related U.S. Application Data

(60) Provisional application No. 62/447,678, filed on Jan. 18, 2017.

(51) Int. Cl.
*E04H 1/02* (2006.01)
*E04B 1/343* (2006.01)

(52) U.S. Cl.
CPC ............... *E04H 1/02* (2013.01); *E04B 1/343* (2013.01)

(58) Field of Classification Search
CPC ... E04H 1/02; E04H 1/12; E04B 1/343; B60P 3/34
See application file for complete search history.

(56) References Cited

U.S. PATENT DOCUMENTS

| 2,499,498 | A | | 3/1950 | Hammond, Jr. |
| RE25,690 | E | * | 11/1964 | Paulsen .................... B60P 3/36 52/32 |

(Continued)

FOREIGN PATENT DOCUMENTS

WO 2015/017671 A2 2/2015

*Primary Examiner* — Adriana Figueroa
(74) *Attorney, Agent, or Firm* — Rodney J. Fuller; Booth Udall Fuller, PLC

(57) ABSTRACT

A dwelling for accommodating users, the dwelling including at least one dividing module provided with respect to a floor surface for separating the floor surface into at least two separate living spaces, the at least one dividing module being selectively adjustable in position with respect to the floor surface for providing the dwelling with selectively adjustable living spaces. The dwelling also includes a displacement assembly operatively connectable to the at least one dividing module for displacing said at least one dividing module about the floor surface. The dwelling also includes a controlling assembly operatively disposed between the at least one dividing module and the displacement assembly for allowing a user of the dwelling to selectively and adjustably position the at least one dividing module with respect to the floor surface of the dwelling, and in turn to selectively and adjustably vary a corresponding layout of the two separate living spaces delimited by the at least one dividing module, in response to a given input of the user and depending on a desired configuration by said user of the dwelling.

14 Claims, 13 Drawing Sheets

(56) References Cited

U.S. PATENT DOCUMENTS

| | | | |
|---|---|---|---|
| 3,346,295 A | 10/1967 | Byer | |
| 3,520,381 A * | 7/1970 | Pinder | B60V 1/16 |
| | | | 180/127 |
| 3,683,100 A * | 8/1972 | Deal | H02G 3/00 |
| | | | 174/491 |
| 3,748,793 A * | 7/1973 | Tompkins | E05D 15/0613 |
| | | | 52/64 |
| 3,757,931 A * | 9/1973 | Baker | B65G 7/06 |
| | | | 198/774.2 |
| 3,796,162 A * | 3/1974 | Burdick | B60V 3/025 |
| | | | 104/23.2 |
| 4,096,675 A * | 6/1978 | Howard | E04B 1/35 |
| | | | 52/143 |
| 4,180,298 A * | 12/1979 | Borgerson, Jr. | B01L 9/02 |
| | | | 312/242 |
| 4,250,669 A | 2/1981 | Freeauf | |
| 4,302,865 A * | 12/1981 | Dixon | E05D 15/0613 |
| | | | 16/102 |
| 4,360,991 A * | 11/1982 | West | E04B 2/7416 |
| | | | 312/286 |
| 4,567,698 A * | 2/1986 | Morrison | A47B 83/001 |
| | | | 160/135 |
| 4,667,580 A * | 5/1987 | Wetzel | F24F 3/161 |
| | | | 165/108 |
| 5,167,575 A * | 12/1992 | MacDonald | E04B 2/827 |
| | | | 454/187 |
| 5,735,639 A | 4/1998 | Payne et al. | |
| 5,740,641 A | 4/1998 | Oxnard | |
| D450,132 S | 11/2001 | Garner et al. | |
| 6,675,540 B1 | 1/2004 | Rokes | |
| 6,981,347 B1 | 1/2006 | Walburger | |
| 7,228,664 B2 * | 6/2007 | Clark | E04B 2/827 |
| | | | 52/243.1 |
| 8,621,787 B2 | 1/2014 | Barry et al. | |
| 8,776,449 B1 | 7/2014 | Rowan | |
| 9,222,255 B2 * | 12/2015 | Johnson | E04B 2/827 |
| 9,410,339 B2 | 8/2016 | Gardner et al. | |
| 9,416,527 B2 | 8/2016 | McInerney | |
| 10,022,873 B2 * | 7/2018 | Larrea-Tamayo | B25J 13/084 |
| 2002/0194796 A1 | 12/2002 | Kress | |
| 2004/0035060 A1 * | 2/2004 | Miyazaki | A47B 53/02 |
| | | | 52/29 |
| 2006/0048458 A1 | 3/2006 | Donald et al. | |
| 2007/0033882 A1 | 2/2007 | Bessent | |
| 2007/0252374 A1 | 11/2007 | Gomez-Espana Collignon | |
| 2007/0266649 A1 | 11/2007 | Overmyer et al. | |
| 2007/0296605 A1 | 12/2007 | Manolescu | |
| 2008/0005976 A1 | 1/2008 | Montaigne | |
| 2010/0126082 A1 | 5/2010 | McLuskey | |
| 2010/0139179 A1 | 6/2010 | Smith et al. | |
| 2011/0107690 A1 * | 5/2011 | Ralston | E04H 1/1205 |
| | | | 52/79.1 |
| 2011/0209735 A1 | 9/2011 | Rowan | |
| 2011/0289860 A1 | 12/2011 | Wilson | |
| 2012/0000142 A1 | 1/2012 | McKimmy et al. | |
| 2012/0006369 A1 | 1/2012 | Cantin et al. | |
| 2012/0222367 A1 | 9/2012 | Wirtz | |
| 2012/0311938 A1 | 12/2012 | Larson | |
| 2013/0014451 A1 | 1/2013 | Russell et al. | |
| 2013/0086849 A1 | 4/2013 | Clouser et al. | |
| 2013/0147634 A1 | 6/2013 | Abraham, III et al. | |
| 2014/0130423 A1 | 5/2014 | Leuchten | |
| 2014/0300087 A1 | 10/2014 | Bell | |
| 2015/0354200 A1 * | 12/2015 | Leclerc | A47B 77/08 |
| | | | 52/79.1 |
| 2016/0145853 A1 | 5/2016 | Timur | |
| 2016/0333569 A1 | 11/2016 | Johnston | |
| 2016/0376784 A1 | 12/2016 | Timur | |

* cited by examiner

DWELLING WITH SELECTIVELY ADJUSTABLE LIVING SPACES, AND CORRESPONDING METHODS ASSOCIATED THERETO

CROSS REFERENCE TO RELATED APPLICATIONS

This application is the U.S. National Stage of International Application No. PCT/CA2018/050058, filed on Jan. 18, 2018, which claims the benefit of and priority to U.S. Provisional Application No. 62/447,678, filed on Jan. 18, 2017, the contents of each of which are expressly incorporated herein by reference in their entireties.

FIELD OF THE INVENTION

The present invention relates to a new innovative type of dwelling, hereinafter referred to also as a "Move Home" (trademark expression currently used by the Applicant of the present patent application for the present concept/system). More particularly, the present invention relates to a dwelling with selectively adjustable living spaces, to a building and/or a residential area provided with at least one of such dwelling, to a kit for assembling the same, and to corresponding methods of manufacturing, assembling and operating associated thereto, as well as to various other different aspects.

BACKGROUND OF THE INVENTION

Concepts for dwellings, such as mobile service block systems, are known in the art.

For example, US patent application No. US 2015/354200 A1 made public on Dec. 10, 2015, and naming Pierre LECLERC as the inventor (same inventor as that of the present application), relates to a "mobile service block system and method". This document describes a mobile service block system including prefabricated bathroom, kitchen and other service room units in a single compact and mobile form for installation and use in buildings. The mobile service block system includes a base frame supporting at least one service unit selected from the group comprising bathroom units, kitchen units, laundry units, and closet units, and a displacement mechanism operatively connected to the base frame for displacement of the base frame and of the mobile service block system from one location to another. A method of installing the mobile service block system in a building and a room unit including the mobile service block system are also disclosed.

Also known to the Applicant are the following patent applications: US 2002/0194796 A1; US 2004/0035060 A1; US 2006/0048458 A1; US 2007/0033882 A1 US 2007/0266649 A1; US 2007/0252374 A1; US 2007/0296605 A1; US 2008/0005976 A1; US 2010/0126082 A1; US 2010/0139179 A1; US 2011/0107690 A1; US 2011/0209735 A1; US 2011/0289860 A1; US 2012/0000142 A1; US 2012/0006369 A1; US 2012/0222367 A1; US 2012/0311938 A1; US 2013/0014451 A1; US 2013/0086849 A1; US 2013/0147634 A1; US 2014/0130423 A1; US 2014/0300087 A1; US 2016/0145853 A1; US 2016/0333569 A1; and US 2016/0376784 A1.

Also known to the Applicant are the following patents: U.S. Pat. Nos. RE25,690 E; D450,132 S; 2,499,498; 3,346,295; 4,250,669; 4,667,580; 5,735,639; 5,740,641; 6,675,540 B1; 6,981,347 B1; 8,621,787 B2; 8,776,449 B1; and 9,416,527 B2.

Despite these considerable improvements, there is always a need to continue innovating and finding better and/or different ways of providing dwellings for people, in a quicker, easier, simpler, faster, more efficient, more economical, more reliable, more adjustable, more versatile, more adaptable, more environmentally-friendly, more sustainable and/or more desirable manner.

SUMMARY OF THE INVENTION

An object of the present invention is to provide a new type of dwelling which, by virtue of its design and components, is intended to satisfy the above-mentioned need and which is thus an improvement over other related dwelling concepts, systems, assemblies and/or methods known in the prior art.

In accordance with the present invention, the above main object is achieved, as will be easily understood, with a dwelling (and/or corresponding associated methods of manufacturing, assembling, use, operation, etc.) such as the one(s) briefly described herein and such as the one exemplified in the accompanying drawings.

More particularly, according to one aspect of the present invention, there is provided a dwelling for accommodating users, the dwelling comprising:
    a floor surface;
    at least one side wall provided about the floor surface;
    at least one dividing module provided with respect to the floor surface for separating the floor surface into at least two separate living spaces, the at least one dividing module being selectively adjustable in position with respect to the floor surface for providing the dwelling with selectively adjustable living spaces (ex. adjustable in size, in configuration, etc.).

According to another aspect of the present invention, there is also provided a dwelling for accommodating users, the dwelling comprising:
    a floor surface;
    at least one side wall provided with respect to the floor surface;
    at least one dividing module provided with respect to the floor surface for separating the floor surface into at least two separate living spaces, the at least one dividing module being selectively adjustable in position with respect to the floor surface for providing the dwelling with selectively adjustable living spaces;
    a displacement assembly operatively connectable to the at least one dividing module for displacing said at least one dividing module about the floor surface of the dwelling; and
    a controlling assembly operatively disposed between the at least one dividing module and the displacement assembly for allowing a user of the dwelling to selectively and adjustably position the at least one dividing module with respect to the floor surface of the dwelling, and in turn to selectively and adjustably vary a corresponding layout of the two separate living spaces delimited by the at least one dividing module, in response to a given input of the user and depending on a desired configuration by said user of the dwelling.

According to yet another aspect of the present invention, there is also provided a station, machine, plant and/or facility for manufacturing the above-mentioned dwelling and/or components thereof.

According to yet another aspect of the present invention, there is also provided a method of manufacturing the above-mentioned dwelling and/or components thereof.

According to yet another aspect of the present invention, there is also provided a building and/or a residential area containing at least one of the above-mentioned dwelling, and preferably, a plurality thereof.

According to yet another aspect of the present invention, there is also provided a method of installing (i.e. assembling, etc.) the above-mentioned dwelling, station, machine, plant, facility and/or components thereof.

According to yet another aspect of the present invention, there is also provided a method of operating (ex. using, etc.) the above-mentioned dwelling, station, machine, plant, facility and/or components thereof.

According to yet another aspect of the present invention, there is also provided a kit with corresponding components for assembling the above-mentioned dwelling, station, machine, plant, facility and/or components thereof.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned method(s), kit, set, dwelling, station, machine, plant, facility and/or components thereof.

According to yet another aspect of the present invention, there is also provided a contract (ex. a purchasing contract, a rental contract, a manufacturing contract, a distribution contract, a licensing contract, etc.) obtained with the above-mentioned method(s), kit, set, dwelling, station, machine, plant, facility and/or components thereof.

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 12 FIG. 11 is a top perspective of what is shown in FIG. 9.

DETAILED DESCRIPTION OF PREFERRED EMBODIMENTS OF THE INVENTION

Figure 1:
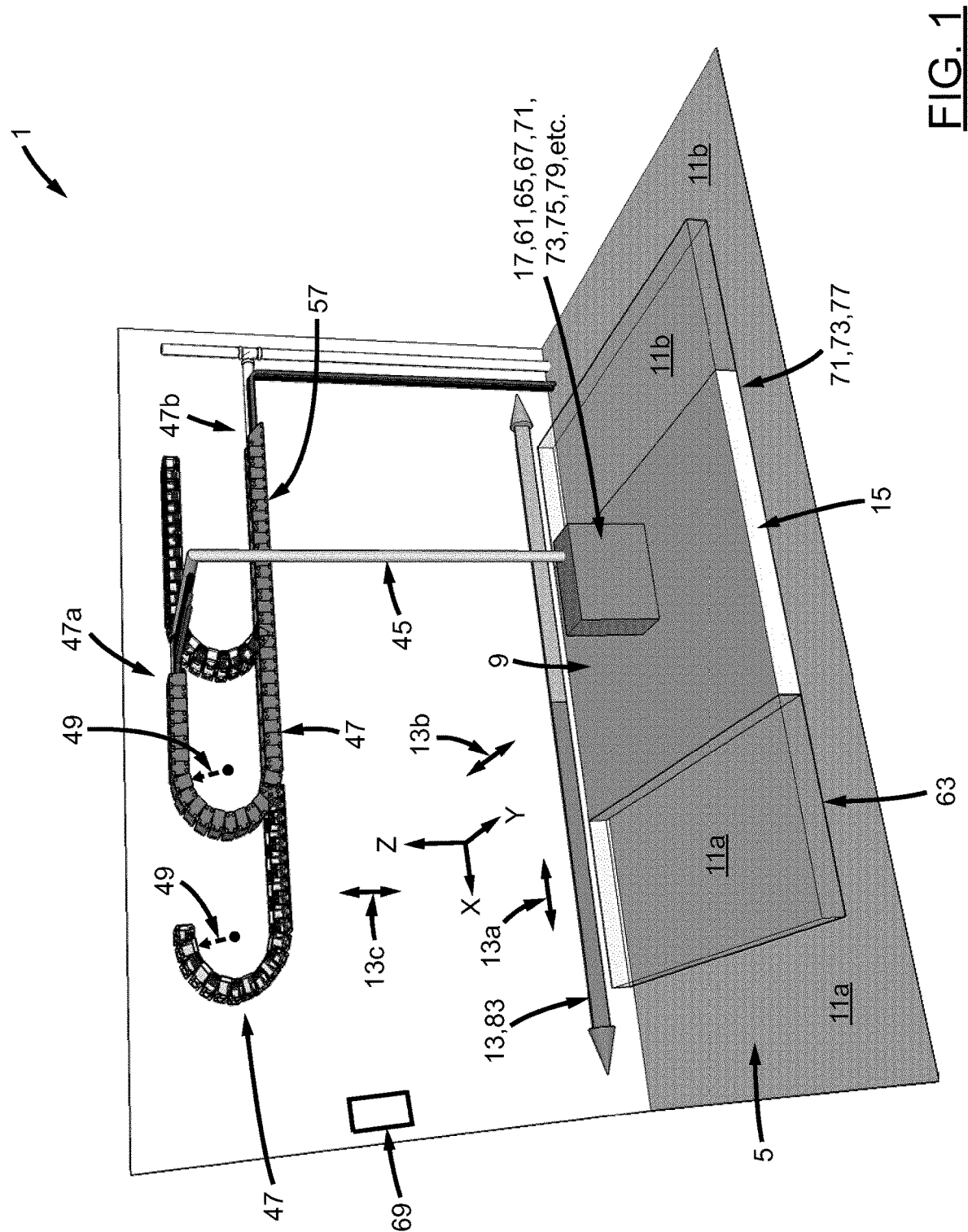
FIG. 1 is a schematic representation of a dwelling including at least one mobile platform for use with a dividing module according to a possible embodiment of the present system.

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions (expressed in inches, and/or centimeters, for example) shown in the figures are preferred, for exemplification purposes only.

Moreover, although the present invention was primarily designed for "residential" purposes, to enable a "dwelling" (ex. "home", "apartment", "condo", etc.) to have selectively adjustable living spaces (ex. kitchen, bedroom, living room, etc.), it may be used with other types of objects, and in other fields, as apparent to a person skilled in the art. For this reason, expressions such as "residential", "dwelling", "home", "apartment", "condo", "living", "space", "kitchen", "bedroom", "living room", etc., used herein should not be taken as to limit the scope of the present invention and include all other kinds of objects or fields with which the present invention could be used and may be useful, as apparent to a person skilled in the art. Indeed, the present invention may be intended and/or used in various other fields, whether commercial (ex. in "work spaces", etc.), industrial, manufacturing, and/or the like, etc.

Moreover, in the context of the present invention, the expressions "dwelling", "home", "Move Home", "Move-Home", "system", "concept", "device", "apparatus", "assembly", "equipment", "product", "station", "module", "unit", "component", "method" and "kit" and "assembly", as well as any other equivalent expressions and/or compound words thereof known in the art will be used interchangeably, as apparent to a person skilled in the art. This applies also for any other mutually equivalent expressions, such as, for example: a) "dwelling", "apartment", "home", "condo", etc.; b) "selectively", "adjustably", "progressively", "controllably", "incrementally", etc.; c) "adjusting", "producing", "manufacturing", "processing", "altering", "modifying", "changing", etc.; d) "living space", "work space", "usage space", etc.; e) "moving", "displacing", "sliding", "translating", etc.; f) "abut", "with respect to", "about", "relative to", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects will have an implicit "longitudinal axis" or "centerline", such as the longitudinal axis of a shaft, or the centerline of a hole, for example (and as a result, there is a "transversal axis" being substantially "perpendicular" to each longitudinal axis, etc.), and that expressions such as "connected" and "connectable", or "mounted" and "mountable", may be interchangeable, in that the present invention also relates to a kit with corresponding components for assembling a resulting fully assembled and operational dwelling with selectively adjustable living spaces, etc.

Moreover, components of the dwelling(s) and/or steps of the method(s) described herein could be modified, simplified, altered, omitted, combined and/or interchanged, whether individually and/or collectively, without departing from the scope of the present invention, depending on the particular applications which the present invention is intended for, and the desired end results, as briefly exemplified herein and as also apparent to a person skilled in the art.

In addition, although the preferred embodiments of the present invention as illustrated in the accompanying drawings may comprise various components, and although the preferred embodiments of the dwelling and corresponding method may consist of certain preferred steps and components as explained herein, not all of these steps and components are essential to the invention and thus should not be taken in their restrictive sense, i.e. should not be taken as to limit the scope of the present invention. It is to be understood, as also apparent to a person skilled in the art, that other suitable step(s), component(s) and cooperation(s) therebetween, may be used for the present dwelling and corresponding method (as well as corresponding components) according to the present invention, as will be briefly explained hereinafter and as can be easily inferred herefrom by a person skilled in the art, without departing from the scope of the invention.

Broadly described, the present invention, as illustrated in the accompanying drawings, relates to the innovative work of M. Pierre Leclerc carried out over several years in order to come up with a new and improved dwelling concept with respect to his previous concept as described in US patent application No. US 2015/354200 A1, the content of which is entirely and/or selectively incorporated herein by reference.

LIST OF NUMERICAL REFERENCES FOR SOME OF THE CORRESPONDING POSSIBLE COMPONENTS ILLUSTRATED IN THE ACCOMPANYING DRAWINGS 1. dwelling (ex. "Move Home" concept/system)
3. user(s)
5. floor surface
7. side wall
7a. longitudinal side wall
7b. end wall
9. dividing module (or simply "module")
11. living space
11a. first living space
11b. second living space
13. degree-of-freedom
13a. first degree-of-freedom (ex. an X-axis)
13b. second degree-of-freedom (ex. a Y-axis)
13c. third degree-of-freedom (ex. a Z-axis)
15. mobile base (ex. mobile platform)
17. unit
17a. kitchen unit
17b. bathroom unit
17c. shower unit
17d. closet unit
17e. storage unit
17f. other unit
19. oven
21. stove top
23. air extractor
25. microwave
27. faucet-and-sink assembly
29. dishwasher
31. refrigerator
33. freezer
35. toilet
37. peripheral unit (of dwelling—ex. unit with foldable bed and/or table, etc.)
39. bathtub
41. shower
43. dehumidifier
45. connection(s) (ex. "utility" connection(s), etc.)
45i. inner connection
45o. outer connection
45a plumbing connection
45b. electrical connection
45c. venting connection
47. connection carrier (ex. chain flex)
47a. first end (of connection carrier)
47b. second end (of connection carrier)
49. minimal radius of curvature
51. link(s) (of connection carrier)
53. chain(s) (of connection carrier)
55. bridging link(s) (of connection carrier)
57. supporting component (for connection carrier)
59. side panel (ex. concealment panel)
61. submersible pump
63. pre-determined operative area (of dividing module)
65. sensor(s) (ex. positioning, smoke, $CO_2$, etc.)
67. actuator (ex. valve, switch, control, etc.)
69. control panel
71. displacement assembly
73. wheel(s) (of dividing module)
75. motor (ex. electrical motor, other type of motor, etc.)
77. hole(s) (for air cushion)
79. device (ex. pump, compressor, etc.)
81. hanging assembly
83. path (ex. track, rail, groove, etc.)

Indeed, the present dwelling concept is particularly advantageous in that, by virtue of its design, components and features, as better described and illustrated herein, it enables to provide dwellings for people, in a quicker, easier, simpler, faster, more efficient, more economical, more reliable, more adjustable, more versatile, more adaptable, more environmentally-friendly, more sustainable and/or more desirable manner, than what is possible with conventional known systems.

The present dwelling (1) may come in the form of a dwelling including one and/or several of the following possible components and/or features (and/or different combination(s)/permutation(s) thereof):

1. A dwelling (1) for accommodating users (3), the dwelling (1) comprising:

a floor surface (5);

at least one side wall (7) provided about the floor surface (5);

at least one dividing module (9) provided about the floor surface (5) for separating the floor surface (5) into at least two separate living spaces (11), the at least one dividing module (9) being selectively adjustable in position with respect to the floor surface (5) for providing the dwelling (1)

with selectively adjustable living spaces (11) (ex. adjustable in size, in configuration, etc.).

2. A dwelling (1) according to any one of the preceding combination(s), wherein the at least one dividing module (9) is configured for displacement along at least one degree-of-freedom (13) (ex. a "first" degree-of-freedom (13a)).

3. A dwelling (1) according to any one of the preceding combination(s), wherein the at least one dividing module (9) is further configured for displacement along at least one other degree-of-freedom (13) (ex. a "second" degree-of-freedom (13b)).

4. A dwelling (1) according to any one of the preceding combination(s), wherein the at least one dividing module (9) is further configured for displacement along yet at least one other degree-of-freedom (13) (ex. a "third" degree-of-freedom (13c)).

5. A dwelling (1) according to any one of the preceding combination(s), wherein each degree-of-freedom (13) is configured for enabling the at least one dividing module (9) to carry out at least one movement selected from the group consisting of: a translational movement, a radial movement, a pivotal movement, a rotational movement, a tilting movement, an arching movement, and/or other corresponding movement being required, etc.

6. A dwelling (1) according to any one of the preceding combination(s), wherein the at least one dividing module (9) comprises a mobile base (15) (ex. a mobile platform, etc.) being displaceable about the floor surface (5).

7. A dwelling (1) according to any one of the preceding combination(s), wherein the at least one dividing module (9) comprises a wheeled base (ex. a wheeled mobile platform, etc.).

8. A dwelling (1) according to any one of the preceding combination(s), wherein the at least one dividing module (9) is configured to move horizontally about the floor surface (5) of the dwelling (1) along at least one substantially rectilinear direction.

9. A dwelling (1) according to any one of the preceding combination(s), wherein the at least one dividing module (9) is configured to move front and back, and vice-versa.

10. A dwelling (1) according to any one of the preceding combination(s), wherein at least two different degrees of motions of the at least one dividing module (9) are substantially perpendicular (ex. orthogonal, etc.) to one another.

11. A dwelling (1) according to any one of the preceding combination(s), wherein in addition to being able to move front and back, and vice-versa, the at least one dividing module (9) is further configured to move left and right, and vice-versa.

12. A dwelling (1) according to any one of the preceding combination(s), wherein three different degrees of motions of the at least one dividing module (9) are substantially perpendicular (ex. orthogonal, etc.) to one another.

13. A dwelling (1) according to any one of the preceding combination(s), wherein in addition to being able to move front and back, and vice-versa, as well as left and right, and vice-versa, the at least one dividing module (9) is further configured to move up and down, and vice-versa.

14. A dwelling (1) according to any one of the preceding combination(s), wherein each degree-of-freedom (13) extends along a substantially rectilinear direction (ex. along a given axis of translation, etc.).

15. A dwelling (1) according to any one of the preceding combination(s), wherein a first degree-of-freedom (13a) of the at least one dividing module (9) extends along a substantially longitudinal direction (ex. along a first axis, such as an "X-axis", for example), wherein a second degree-of-freedom (13b) of the at least one dividing module (9) extends along a substantially transversal direction (ex. along a second axis, such as a "Y-axis", for example), and wherein a third degree-of-freedom (13c) of the at least one dividing module (9) extends along a substantially vertical direction (ex. along a third axis, such as a "Z-axis", for example).

16. A dwelling (1) according to any one of the preceding combination(s), wherein the dwelling (1) comprises at least one unit (17) selected from the group consisting of a kitchen unit (17a), a bathroom unit (17b), a shower unit (17c), a closet unit (17d), a storage unit (17e), and/or other corresponding unit (17) being required for the dwelling (1), etc.

17. A dwelling (1) according to any one of the preceding combination(s), wherein the kitchen unit (17a) is contained within (ex. about, on, inside, and/or other, etc.) the at least dividing module (9) (and/or a corresponding portion thereof, etc.), and is thus, selectively displaceable with respect to the floor surface (5) of the dwelling (1) via a corresponding displacement of the at least dividing module (9).

18. A dwelling (1) according to any one of the preceding combination(s), wherein the bathroom unit (17b) is contained within (ex. about, on, inside, and/or other, etc.) the at least dividing module (9) (and/or a corresponding portion thereof, etc.), and is thus, selectively displaceable with respect to the floor surface (5) of the dwelling (1) via a corresponding displacement of the at least dividing module (9).

19. A dwelling (1) according to any one of the preceding combination(s), wherein the shower unit (17c) is contained within (ex. about, on, inside, and/or other, etc.) the at least dividing module (9) (and/or a corresponding portion thereof, etc.), and is thus, selectively displaceable with respect to the floor surface (5) of the dwelling (1) via a corresponding displacement of the at least dividing module (9).

20. A dwelling (1) according to any one of the preceding combination(s), wherein the closet unit (17d) is contained within (ex. about, on, inside, and/or other, etc.) the at least dividing module (9) (and/or a corresponding portion thereof, etc.), and is thus, selectively displaceable with respect to the floor surface (5) of the dwelling (1) via a corresponding displacement of the at least dividing module (9).

21. A dwelling (1) according to any one of the preceding combination(s), wherein the storage unit (17e) is contained within (ex. about, on, inside, and/or other, etc.) the at least dividing module (9) (and/or a corresponding portion thereof, etc.), and is thus, selectively displaceable with respect to the floor surface (5) of the dwelling (1) via a corresponding displacement of the at least dividing module (9).

22. A dwelling (1) according to any one of the preceding combination(s), wherein several units (17) (ex. one and/or several of the aforementioned units (17) and/or others) are all contained within (ex. about, on, inside, and/or other, etc.) the at least dividing module (9) (and/or a corresponding portion thereof, etc.), and are thus, selectively displaceable with respect to the floor surface (5) of the dwelling (1) via a corresponding displacement of the at least dividing module (9).

23. A dwelling (1) according to any one of the preceding combination(s), wherein the kitchen unit (17a) includes at least one appliance selected from the group consisting of an oven (19), a stove top (21), an air extractor (23), a microwave (25), a faucet-and-sink assembly (27), a dishwasher (29), a refrigerator (31), a freezer (33), etc.

24. A dwelling (1) according to any one of the preceding combination(s), wherein the bathroom unit (17b) includes at least one utility service selected from the group consisting of a toilet (35), a faucet-and-sink assembly (27), a bathtub (39), a shower (41), a dehumidifier (43), etc.

25. A dwelling (1) according to any one of the preceding combination(s), wherein each unit (ex. one and/or several of the aforementioned units (17) and/or others) is prefabricated prior to installing into the dwelling (1) about the at least one dividing module (9).

26. A dwelling (1) according to any one of the preceding combination(s), wherein unassembled components of each unit (17) (ex. one and/or several of the aforementioned units (17) and/or others) are shaped and sized to fit through a corresponding standard-sized door (ex. of the present dwelling (1), and/or of a building containing the present dwelling (1), etc.—and/or of a corresponding elevator thereof, etc.).

27. A dwelling (1) according to any one of the preceding combination(s), wherein the dwelling (1) includes at least one inner plumbing connection (45a) being operatively connectable to at least one outer plumbing connection (45a) provided outside of the dwelling (1).

28. A dwelling (1) according to any one of the preceding combination(s), wherein the dwelling (1) includes at least one inner electrical connection (45b) being operatively connectable to at least one outer electrical connection (45b) provided outside of the dwelling (1).

29. A dwelling (1) according to any one of the preceding combination(s), wherein the dwelling (1) includes at least one inner venting connection (45c) being operatively connectable to at least one outer venting connection (45c) provided outside of the dwelling (1).

30. A dwelling (1) according to any one of the preceding combination(s), wherein inner connection(s) (45) (ex. plumbing, electrical, venting, and/or etc.) of the dwelling (1) is(are) provided about the at least one dividing module (9).

31. A dwelling (1) according to any one of the preceding combination(s), wherein inner connection(s) (45) (ex. plumbing, electrical, venting, and/or etc.) of the dwelling (1) is(are) operatively connected to corresponding units (17) (ex. kitchen unit (17a), a bathroom unit (17b), a shower unit (17c), a closet unit (17d), a storage unit (17e), etc. and/or corresponding components thereof) of the at least one dividing module (9).

32. A dwelling (1) according to any one of the preceding combination(s), wherein the dwelling (1) comprises a connection carrier (47) for carrying (ex. supporting, linking, connecting, interconnecting, relaying, etc.) inner connection(s) (45) (ex. plumbing, electrical, venting, and/or etc.) of the dwelling (1) to corresponding outer connection(s) (45) (ex. plumbing, electrical, venting, and/or etc.).

33. A dwelling (1) according to any one of the preceding combination(s), wherein the connection carrier (47) is a flexible connection carrier (47) having a moveable first end (47a) operatively connectable to inner connection(s) (45) (ex. plumbing, electrical, venting, and/or etc.) of the at least one dividing module (9), and a second end (47b) being substantially fixed and operatively connectable to corresponding outer connection(s) (45) (ex. plumbing, electrical, venting, and/or etc.) (ex. such as those of the building, etc.).

34. A dwelling (1) according to any one of the preceding combination(s), wherein the connection carrier (47) is configured for preventing a bending of inner connection(s) (45) (ex. plumbing, electrical, venting, and/or etc.) beyond a minimal radius of curvature (49) (for example, for ensuring proper functioning and/or preventing damage of the connections, etc.).

35. A dwelling (1) according to any one of the preceding combination(s), wherein the connection carrier (47) is an articulated connection carrier (47) including a plurality of links (51).

36. A dwelling (1) according to any one of the preceding combination(s), wherein the connection carrier (47) includes a pair of elongated chains (53) defining a space therebetween through which inner connection(s) (45) (ex. plumbing, electrical, venting, and/or etc.) are allowed to pass and bend.

37. A dwelling (1) according to any one of the preceding combination(s), wherein the connection carrier (47) includes bridging links (55) interconnecting the pair of elongated chains (53) for containing inner connection(s) (45) (ex. plumbing, electrical, venting, and/or etc.) within the connection carrier (47).

38. A dwelling (1) according to any one of the preceding combination(s), wherein the connection carrier (47) includes a chain flex.

39. A dwelling (1) according to any one of the preceding combination(s), wherein a first portion of the connection carrier (47) is extendable along a corresponding supporting component (57) of the dwelling (1), and wherein a second portion of the connection carrier (47) is bendable and moveable over said first portion of the connection carrier (47).

40. A dwelling (1) according to any one of the preceding combination(s), wherein the first portion of the connection carrier (47) is extendable along a substantially flattened surface provided about a corresponding side panel (59) (ex. wall panel, ceiling panel, floor panel, etc.) of the dwelling (1), and wherein a second portion of the connection carrier (47) is bendable and moveable over (ex. about, in proximity of, adjacent to, etc.) said first portion of the connection carrier (47).

41. A dwelling (1) according to any one of the preceding combination(s), wherein the side panel (59) is a concealment panel, and wherein the connection carrier (47) is substantially contained (ex. concealed, etc.) within the concealment panel.

42. A dwelling (1) according to any one of the preceding combination(s), wherein the at least one dividing module (9) comprises a submersible pump (61) (see explanations below of possible embodiment(s)).

43. A dwelling (1) according to any one of the preceding combination(s), wherein the dwelling (1) comprises at least one substantially rectangular portion about which the at least one dividing module (9) is selectively displaceable.

44. A dwelling (1) according to any one of the preceding combination(s), wherein the at least one substantially rectangular portion of the dwelling (1) comprises a pair of longitudinal side walls (7a), and a pair of end walls (7b).

45. A dwelling (1) according to any one of the preceding combination(s), wherein the end walls (7b) are shorter in length than the longitudinal side walls (7a) of the dwelling (1).

46. A dwelling (1) according to any one of the preceding combination(s), wherein the substantially rectangular portion is a substantially square portion, and thus, wherein corresponding walls of said portion are substantially equal in length to one another.

47. A dwelling (1) according to any one of the preceding combination(s), wherein the at least one dividing module (9) is configured to be selectively displaceable about a predetermined operative area (63) of the floor surface (5).

48. A dwelling (1) according to any one of the preceding combination(s), wherein the dwelling (1) comprises positioning sensors (65) for delimiting movement of the at least one dividing module (9) within at least one pre-determined operative area (63) of the floor surface (5).

49. A dwelling (1) according to any one of the preceding combination(s), wherein the at least one pre-determined operative area (63) of the floor surface (5) is adjustable, and programmable (ex. in size, in time, in date, etc.) via a corresponding control panel (69) of the dwelling (1).

50. A dwelling (1) according to any one of the preceding combination(s), wherein the dwelling (1) comprises positioning sensors (65) for sensing positioning of the at least one dividing module (9), of user(s) (3) and/or accessory(ies) (ex. furniture, decoration, etc.) of the dwelling (1), and for stopping movement of the at least one dividing module (9) in order to prevent and/or minimize any possible interference (ex. collision, obstruction, etc.).

51. A dwelling (1) according to any one of the preceding combination(s), wherein the dwelling (1) comprises positioning sensors (65) for sensing positioning of a user (3) in proximity of a given unit (17) of the dwelling (1), and for allowing operation of said given unit (17) only upon detecting proximity of the user (3).

52. A dwelling (1) according to any one of the preceding combination(s), wherein the dwelling (1) is further configured to prevent operating capability of a given unit (17) when presence of a user (3) is not detected in proximity of said given unit (17).

53. A dwelling (1) according to any one of the preceding combination(s), wherein plumbing operation (ex. provision of water, whether hot and/or cold, etc.) of a given unit (17) is controlled via at least one corresponding electrical valve (ex. switch, control, actuator (67), etc.) being in communication with a corresponding positioning sensor (65) of the dwelling (1).

54. A dwelling (1) according to any one of the preceding combination(s), wherein electrical operation of a given unit (17) is controlled via at least one corresponding electrical switch (ex. control, actuator (67), etc.) being in communication with a corresponding positioning sensor (65) of the dwelling (1).

55. A dwelling (1) according to any one of the preceding combination(s), wherein venting operation of a given unit (17) is controlled via at least one corresponding electrical valve (ex. switch, control, actuator (67), etc.) being in communication with a corresponding positioning sensor (65) of the dwelling (1).

56. A dwelling (1) according to any one of the preceding combination(s), wherein a corresponding operation of a given unit (17) is controlled via at least one corresponding switch (ex. control, actuator (67), etc.) upon detection of an undesirable condition within the dwelling (1) (ex. water faucets could be turned on, and/or vents could be shut off, etc., in the event of a fire, etc.—alternatively, vents, such as air extractors (23), could be turned on in the event of undesirable substances in the breathable air of the dwelling (1), etc.—optionally also, vents, such as dehumidifiers (43), could be turned on in the event of high levers of humidity in the dwelling (1), etc.).

57. A dwelling (1) according to any one of the preceding combination(s), wherein the dwelling (1) comprises different sensors (65) for detecting different parameters (ex. levels of heat, level of moisture, level of $CO_2$, possible presence of fire, etc.) within the dwelling (1), these sensors (65) being connected to corresponding controls within the dwelling (1) for modifying the parameters accordingly based on pre-established conditions and/or parameters being selectively set by a user (3) via a corresponding control panel (69) of the dwelling (1).

58. A dwelling (1) according to any one of the preceding combination(s), wherein electrical operation of a given unit (17) is controlled via at least one corresponding electrical valve being in communication with a corresponding positioning sensor (65) of the dwelling (1).

59. A dwelling (1) according to any one of the preceding combination(s), wherein the at least one dividing module (9) is displaceable about the floor surface (5) of the dwelling (1) via at least one displacement assembly (71).

60. A dwelling (1) according to any one of the preceding combination(s), wherein the displacement assembly (71) comprises at least one wheel (73) (ex. a plurality of wheels (73) provided under and/or about the at least one dividing module (9)).

61. A dwelling (1) according to any one of the preceding combination(s), wherein the at least one dividing module (9) and corresponding at least one wheel (73) are manually operated (ex. displaceable, adjusted, moved, driven, etc.) by a corresponding user (3) of the dwelling (1).

62. A dwelling (1) according to any one of the preceding combination(s), wherein the at least one wheel (73) (ex. one and/or several wheels (73)) is driven by at least one corresponding motor (75) (ex. electrical motor, and/or other type of motor, etc.).

63. A dwelling (1) according to any one of the preceding combination(s), wherein the displacement assembly (71) includes a magnetic field acting between the floor surface (5) and the at least one dividing module (9).

64. A dwelling (1) according to any one of the preceding combination(s), wherein the displacement assembly (71) includes an air cushion generated under a base of the at least one dividing module (9) for raising the least one dividing module (9) with respect to the floor surface (5) (thereby reducing friction between the floor surface (5) and the at least one dividing module (9), and enabling an easier displacement of the dividing module (9) about the floor surface (5), etc.).

65. A dwelling (1) according to any one of the preceding combination(s), wherein air of the air cushion is provided via corresponding holes (77) disposed about the floor surface (5) and/or about the base of the at least one dividing module (9).

66. A dwelling (1) according to any one of the preceding combination(s), wherein the dwelling (1) comprises a corresponding device (79) (ex. pump, compressor, etc.) for providing air to the air cushion via corresponding piping connected to the corresponding holes (77) disposed about the floor surface (5) and/or about the base of the at least one dividing module (9).

67. A dwelling (1) according to any one of the preceding combination(s), wherein the displacement assembly (71) includes a hanging assembly (81) for hanging (ex. suspending, etc.) the at least one dividing module (9) from a ceiling of the dwelling (1).

68. A dwelling (1) according to any one of the preceding combination(s), wherein the at least one dividing module (9) and/or corresponding hanging assembly (81) thereof are manually operated (ex. displaceable, adjusted, moved, driven, etc.) by a corresponding user (3) of the dwelling (1).

69. A dwelling (1) according to any one of the preceding combination(s), wherein the at least one dividing module (9) and/or corresponding hanging assembly (81) thereof are electrically operated (ex. displaceable, adjusted, moved, driven, etc.) by at least one corresponding motor (75) (ex. electrical motor, and/or other type of motor, etc.).

70. A dwelling (1) according to any one of the preceding combination(s), wherein the displacement assembly (71) and/or components thereof (ex. motor(s), etc.)) are selectively controlled via a control panel (69) of the dwelling (1).

71. A dwelling (1) according to any one of the preceding combination(s), wherein the at least one dividing module (9) is configured for being selectively adjustable (ex. moveable, etc.) with respect to the floor surface (5) of the dwelling (1) via a corresponding path (83) (ex. track, rail, groove, restriction, guidance, etc.).

72. A dwelling (1) according to any one of the preceding combination(s), wherein the corresponding path (83) (ex. track, rail, groove, restriction, guidance, etc.) is provided along a corresponding side wall (7) of the dwelling (1).

73. A dwelling (1) according to any one of the preceding combination(s), wherein the corresponding path (83) (ex. track, rail, groove, restriction, guidance, etc.) is provided along a corresponding floor surface (5) of the dwelling (1).

74. A dwelling (1) according to any one of the preceding combination(s), wherein the corresponding path (83) (ex. track, rail, groove, restriction, guidance, etc.) is provided along a corresponding ceiling surface of the dwelling (1).

75. A dwelling (1) according to any one of the preceding combination(s), wherein the corresponding path (83) (ex. track, rail, groove, restriction, guidance, etc.) is further configured (ex. anchored, etc.) for preventing the at least one dividing module (9) from tipping over during seismic activity (ex. during an earthquake, etc.).

76. A dwelling (1) according to any one of the preceding combination(s), wherein the dwelling (1) comprises at least one first living area (ex. a living room, dining room, and/or other) provided on one side of the at least one dividing module (9), and at one second living area (ex. a bedroom and/or other) provided on the other side of the at least one dividing module (9).

77. A dwelling (1) according to any one of the preceding combination(s), wherein one and/or several of the different components (ex. module(s) (9), unit(s) (17), etc.) are provided with complementary interlocking joints (ex. complementary male and female components, complementary tenon and mortise joints, etc.) in order to ensure proper orientation (ex. alignment, etc.) of the components with respect to one another and/or in order to ensure proper assembling of the components onto one another.

78. A dwelling (1) according to any one of the preceding combination(s), wherein one and/or several of the different components of the dwelling (1) (ex. at least one dividing module (9), etc.) are made from injection molding.

79. A kit with corresponding components for assembling a dwelling (1) according to any one of the preceding combination(s).

80. At least one dividing module (9) for use with a dwelling (1) according to any one of the preceding combination(s).

81. A kit with corresponding components for assembling at least one dividing module (9) according to any one of the preceding combination(s).

Brief Overview of the Module:

As can now be better appreciated, the present system concerns a mobile platform on which it is possible to install all the systems that are essential to daily life in a dwelling. This platform can be entirely manufactured in factory in various subassemblies, which can be determined (ex. decided, chosen, selected, etc.) by the client, according to particular/specific needs. A possible listing of the majority of the available subassemblies include: kitchen, powder room, toilet room, mechanical or utility room, shower, storage, and/or the like. The aim of the module is to bring together all the services required for living in a dwelling (ex. an apartment, condo, etc.), facilitating therefore the integration and the installation of these essential services. The installation is done quickly and practically without the aid of any specialized workmanship, tools, etc. No wall fixtures (ex. studs, etc.) are required, in that, it is not necessary to install the plumbing and the electricity through the walls, but rather all is done in an "over-hanging" manner, therefore facilitating any inspection, maintenance and/or repair(s) being required, and also limiting greatly any potential damages, etc. According to an advantageous embodiment, the different disassembled components and pieces of the module are shaped and sized to pass through a standard apartment door. Furthermore, the displacement of the module is generated by a control system resulting in an increased security, and ease of use.

Systems and Subsystems:

Concerning the mobile platform, and according to a given embodiment, the platform is made from a metallic material, such as aluminium or steel, for example, chosen in accordance with various design criteria. The choice of the subassemblies is usually an important main criteria, therefore, determining also the resulting weight to be sustained, etc. The base can itself be composed of various assembly sections which could be linked to one another via mechanical link(s), thereby facilitating the transportation and the handling thereof.

Concerning the kitchen, and according to a possible embodiment, the kitchen is preferably a preassembled kitchen manufactured in a factory. It can be configured differently depending on the particular desires and needs of the client. The kitchen can include one or several of the following possible components, namely: a sink, a dishwasher, a refrigerator, a microwave oven, an air extractor, etc. The kitchen (and/or other modules/parts/walls of the present system, etc.) can also be made of various materials, such as for example, with corrugated panels, agglomerated panels, etc.

Concerning the toilet room, and according to a possible embodiment, it may comprise a toilet and a sink with a corresponding faucet, including cold and hot water and/or mixture thereof.

Concerning the shower, the subassembly may be designed so as to entirely include the floor, wall and/or roof. The shower may comprise its own pumping system being independently activated by the control system. It may also comprise a dehumidifying system enabling to reduce the humidity in the shower assembly, dividing module, and/or remaining apartment.

Figure 2:
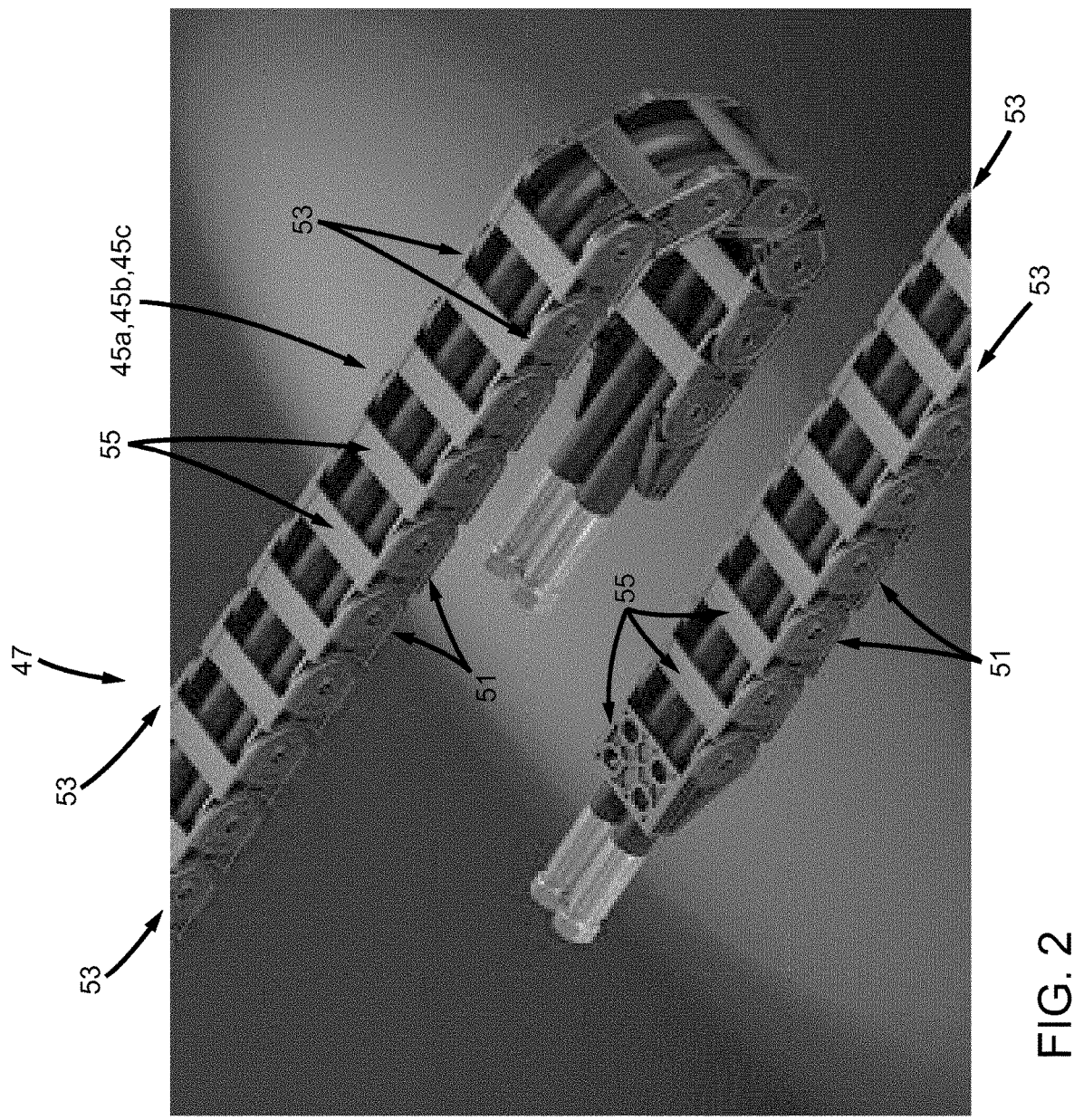
FIG. 2 is a partial perspective of examples of possible connection carriers which can be used with what is shown in FIG. 1 according to different possible embodiments of the present system.
Figure 3:
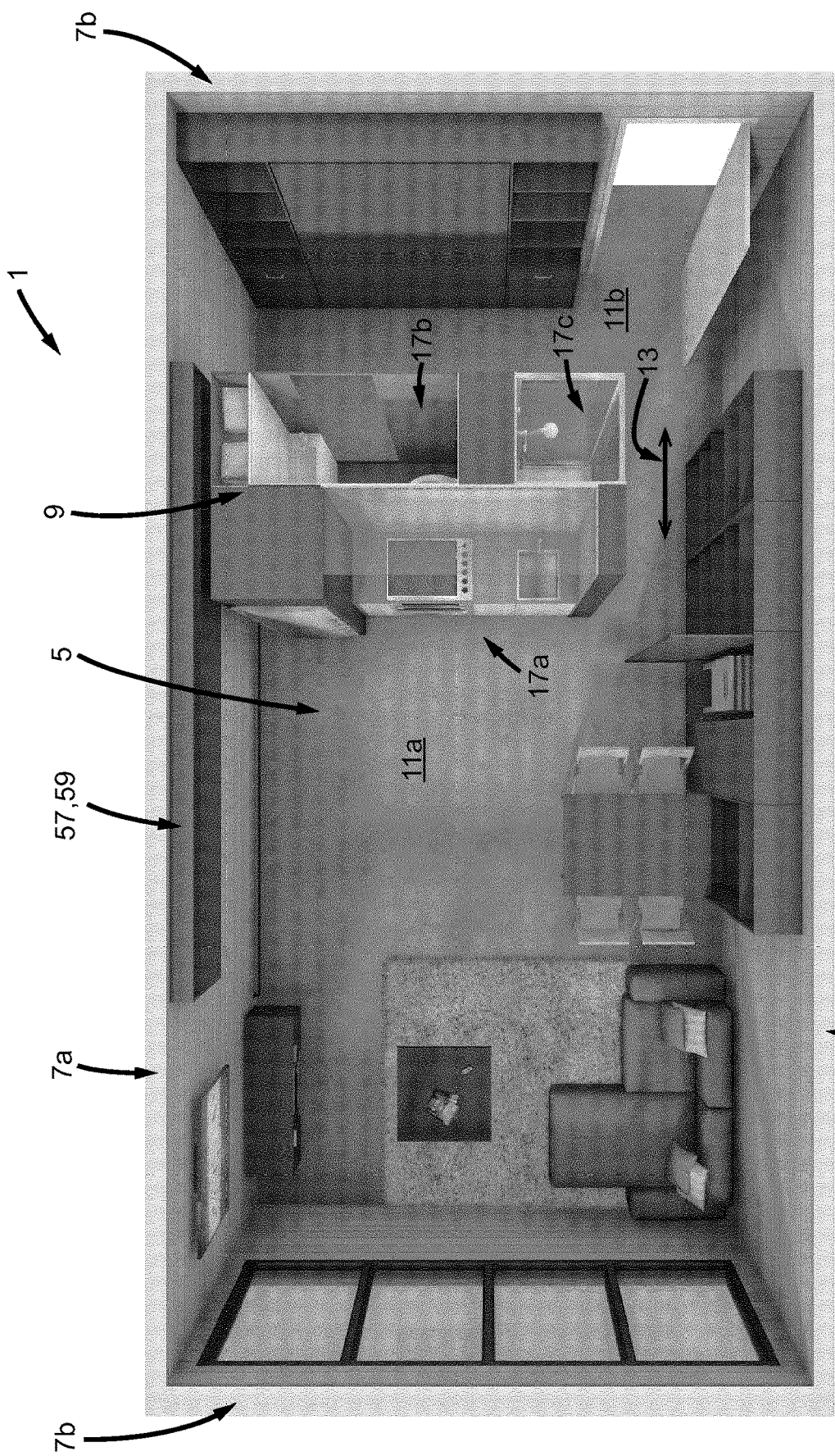
FIG. 3 is a top view of a dwelling according to a possible embodiment of the present system, the dwelling being shown with its dividing module in a first given configuration (ex. a "daytime" configuration).
Figure 4:
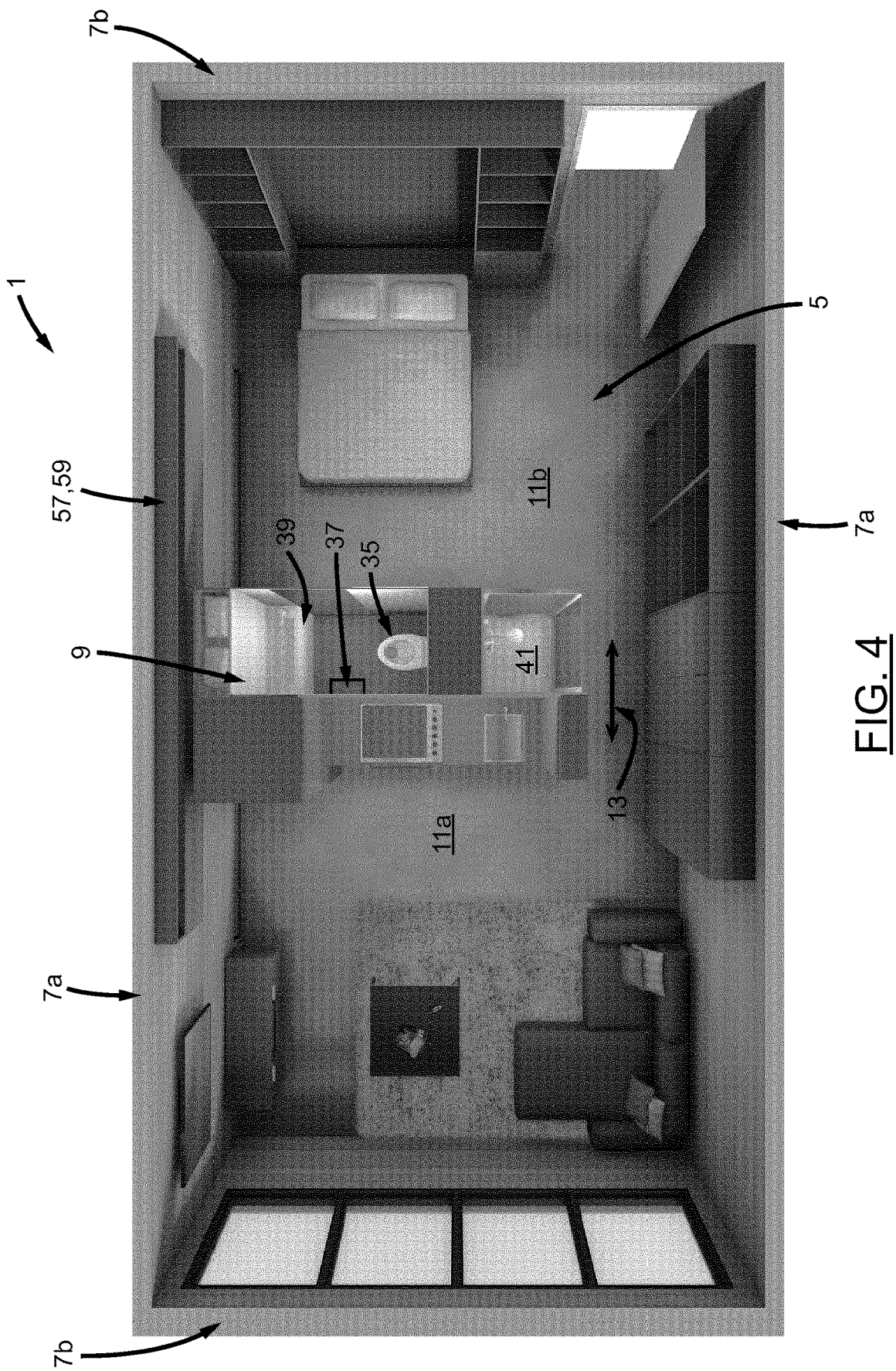
FIG. 4 is another top view of what is shown in FIG. 3, the dwelling being now shown with its dividing module in a second given configuration (ex. a "nighttime" configuration)
.
Figure 5:
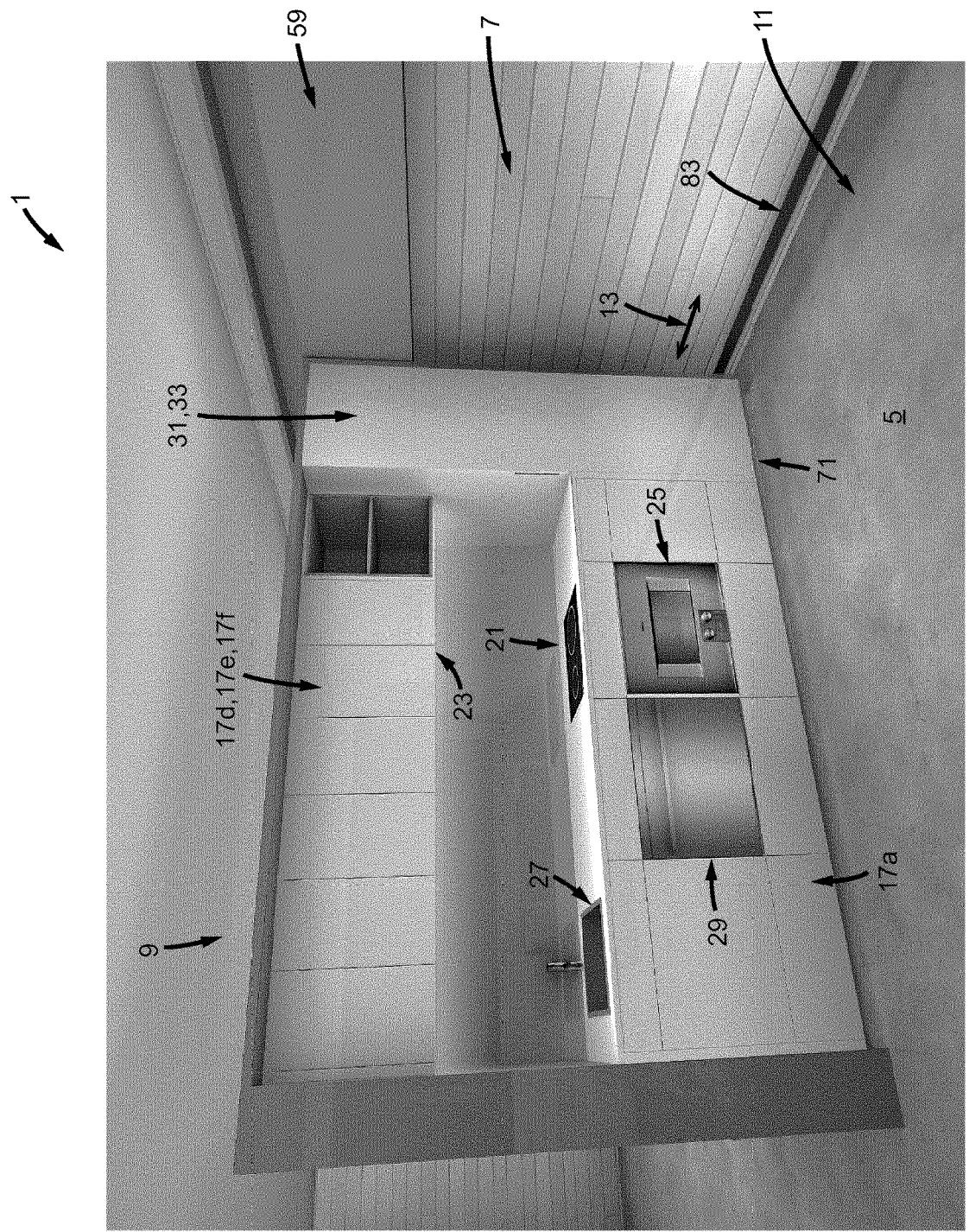
FIG. 5 is a partial inside view of a dwelling according to another possible embodiment of the present system.
Figure 6:
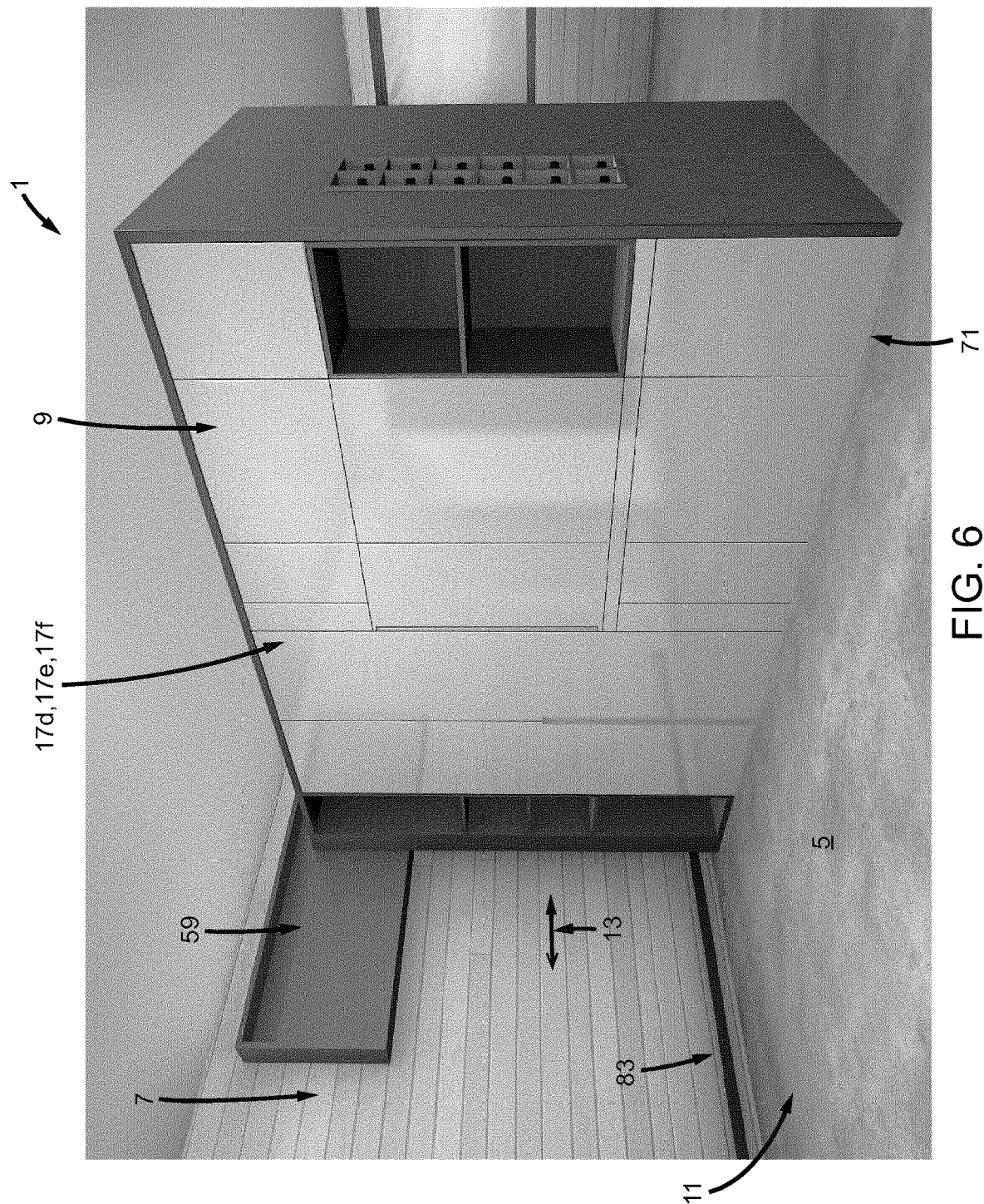
FIG. 6 is a partial inside view of a dwelling according to another possible embodiment of the present system.
Figure 7:
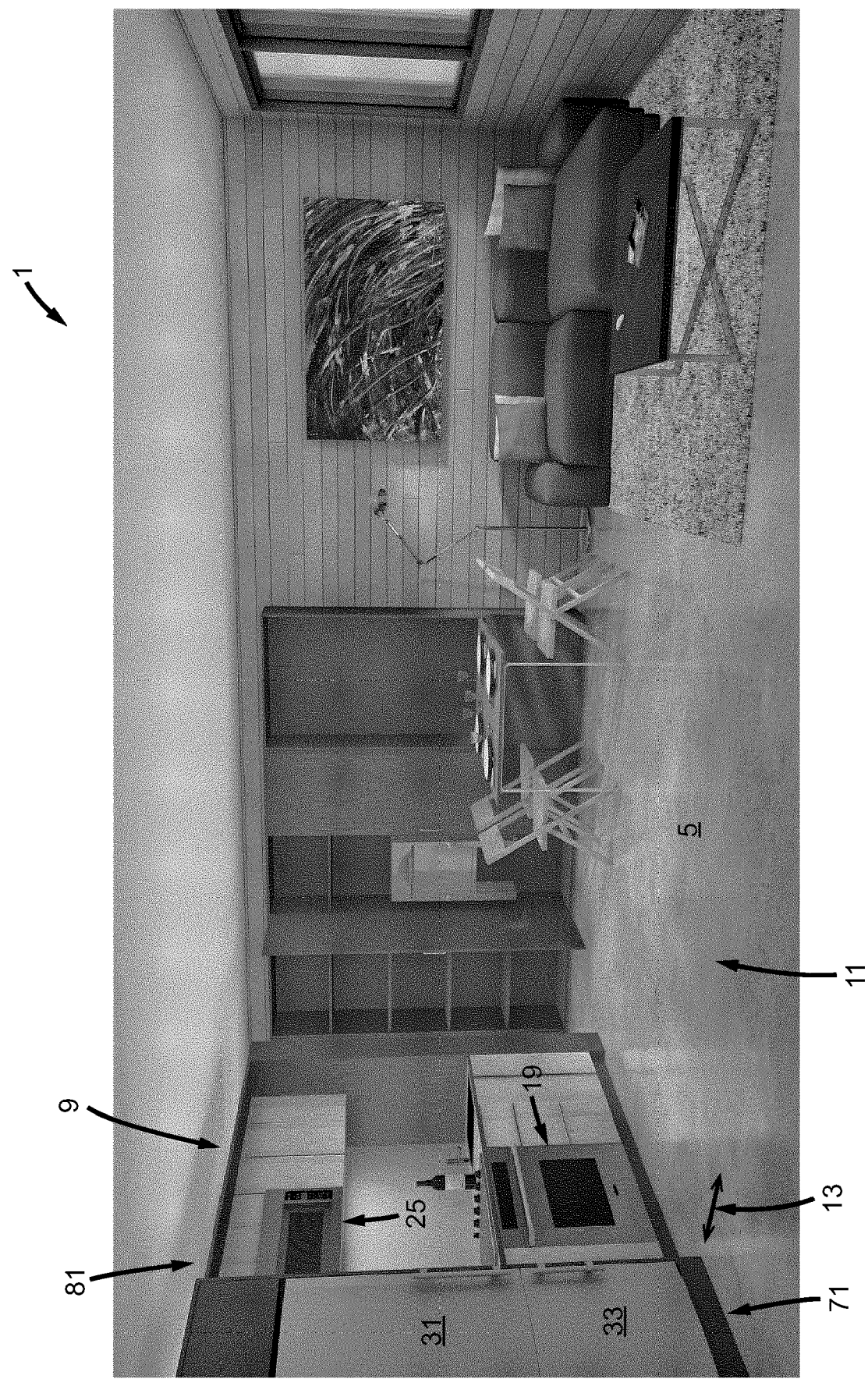
FIG. 7 is a partial inside view of a dwelling according to another possible embodiment of the present system.
Figure 8:
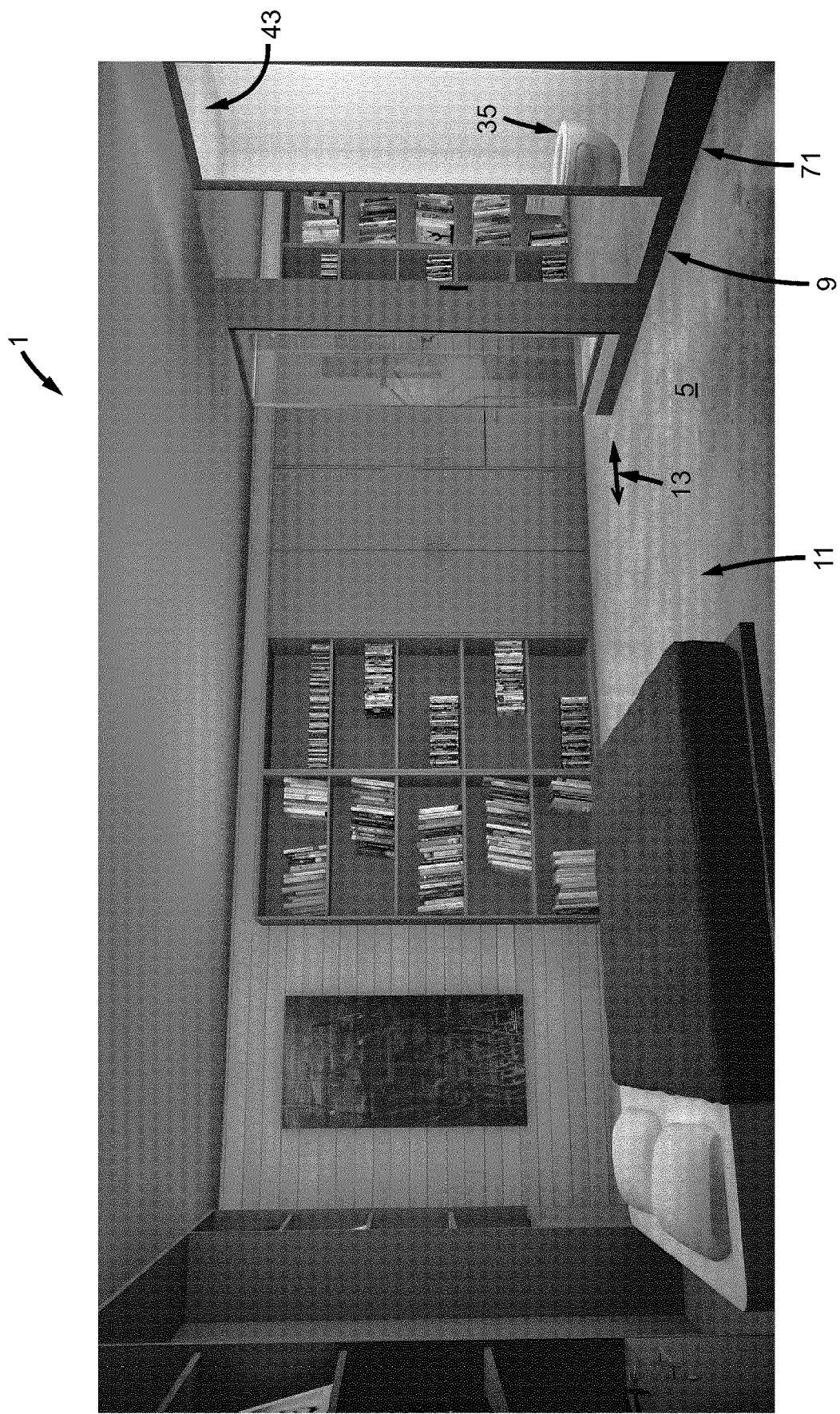
FIG. 8 is a partial inside view of a dwelling according to another possible embodiment of the present system.
Figure 9:
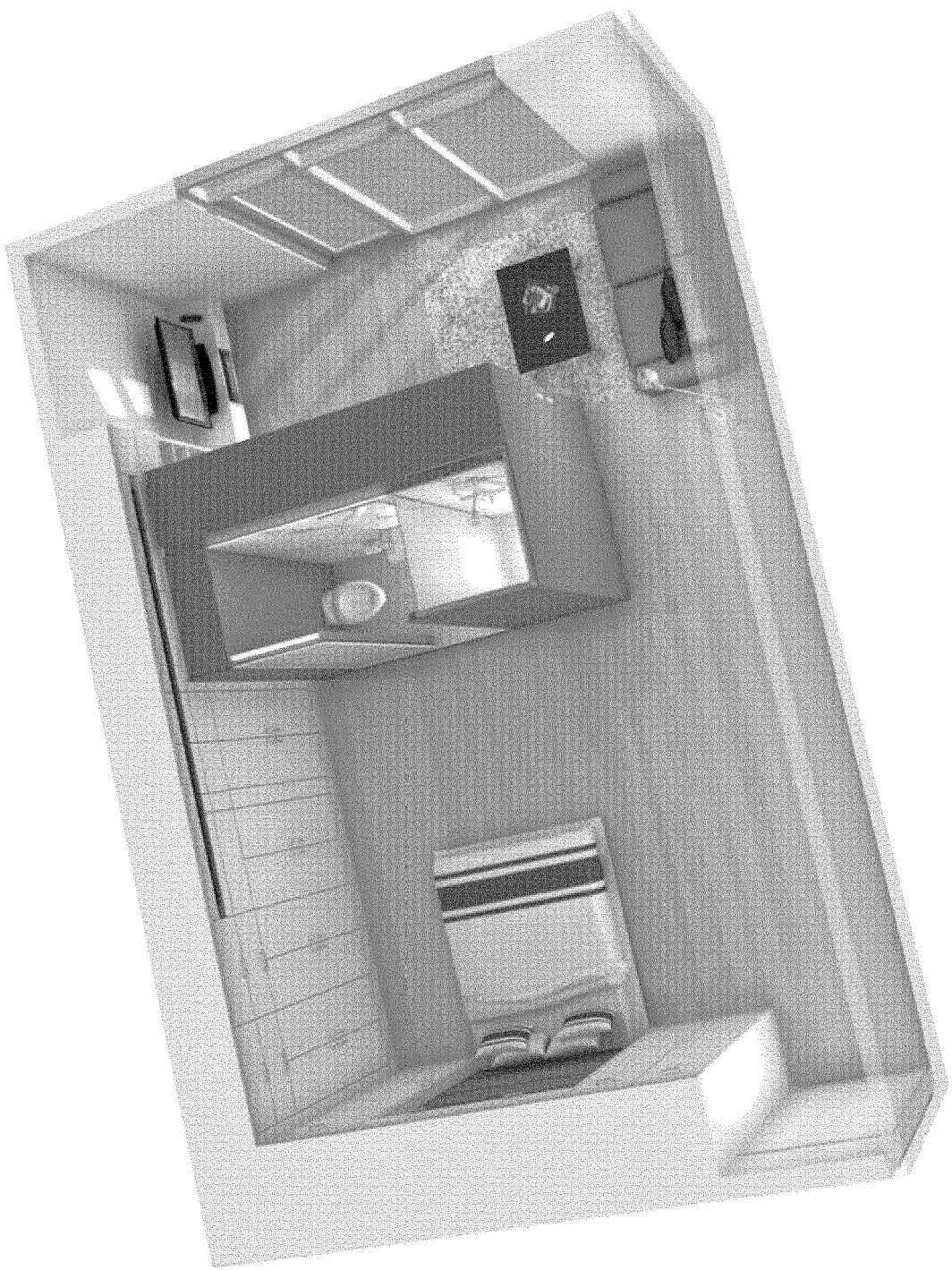
FIG. 9 is a top perspective view of a dwelling according to a possible embodiment of the present system, the dwelling being shown with its dividing module in a first given configuration (ex. a "nighttime" configuration).
Figure 10:
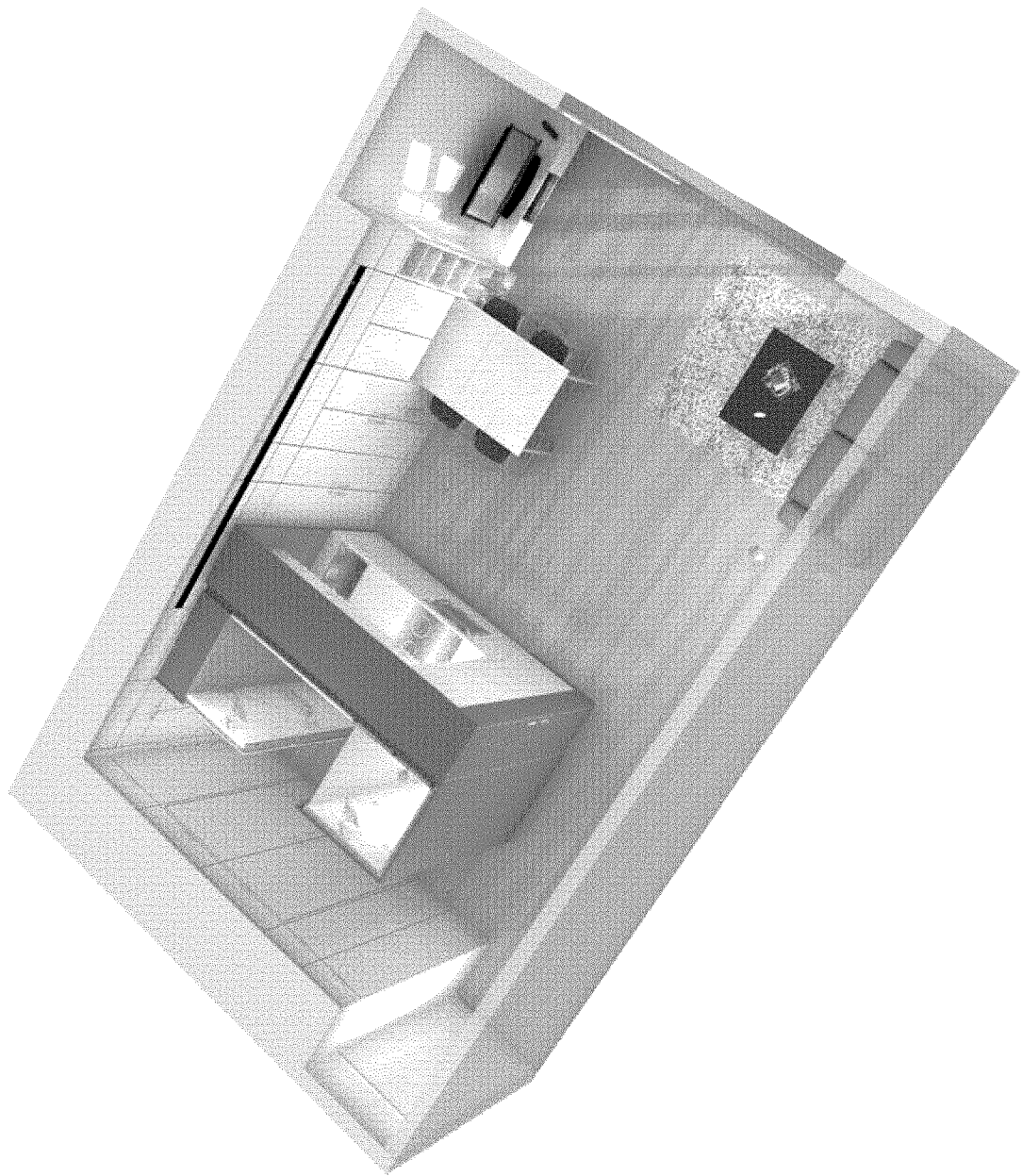
FIG. 10 is another top perspective view of what is shown in FIG. 9, the dwelling being now shown with its dividing module in a second given configuration (ex. a "daytime" configuration).
Figure 11:
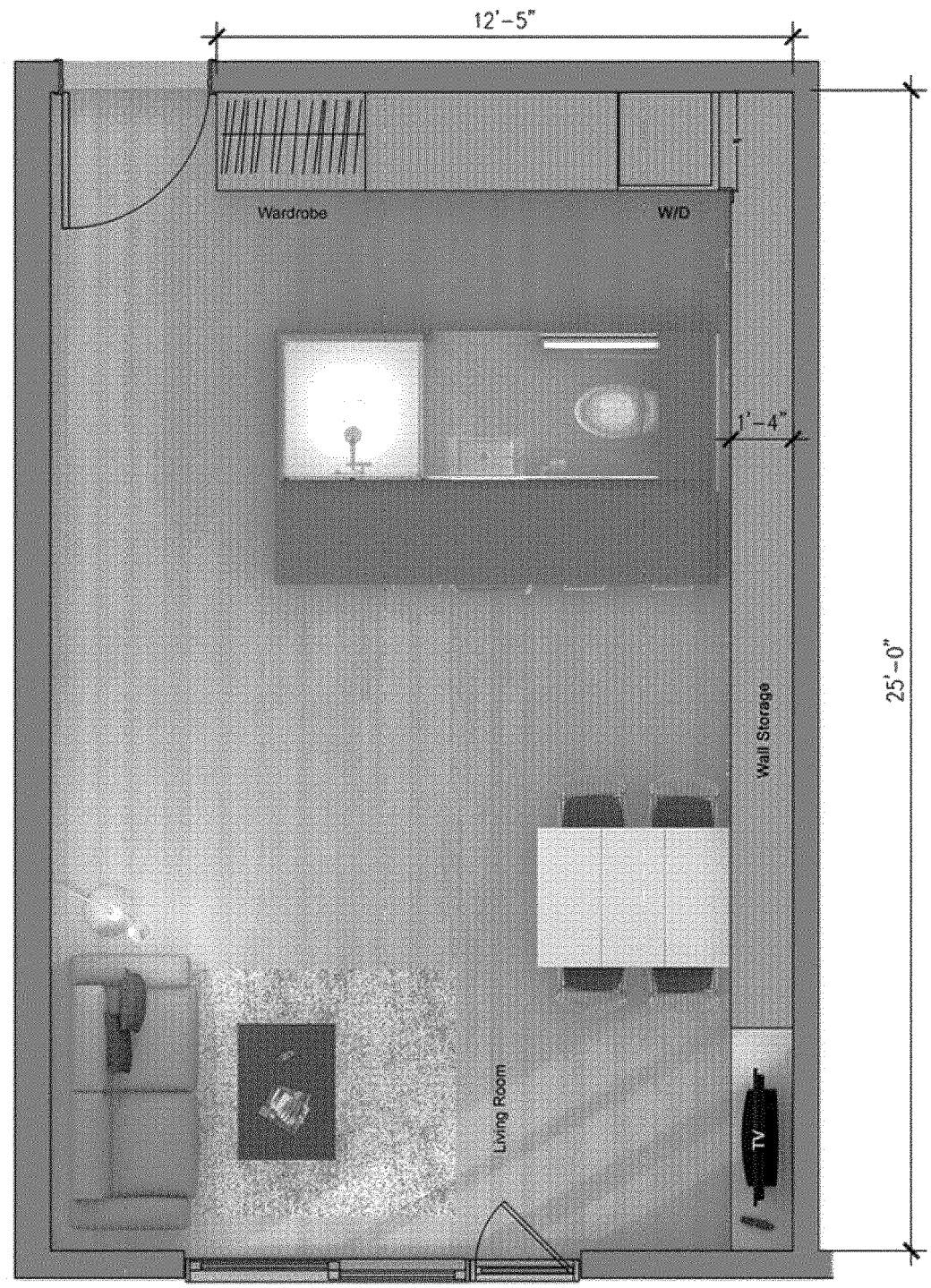
FIG. 11 is a top perspective of what is shown in FIG. 10.
Figure 12:
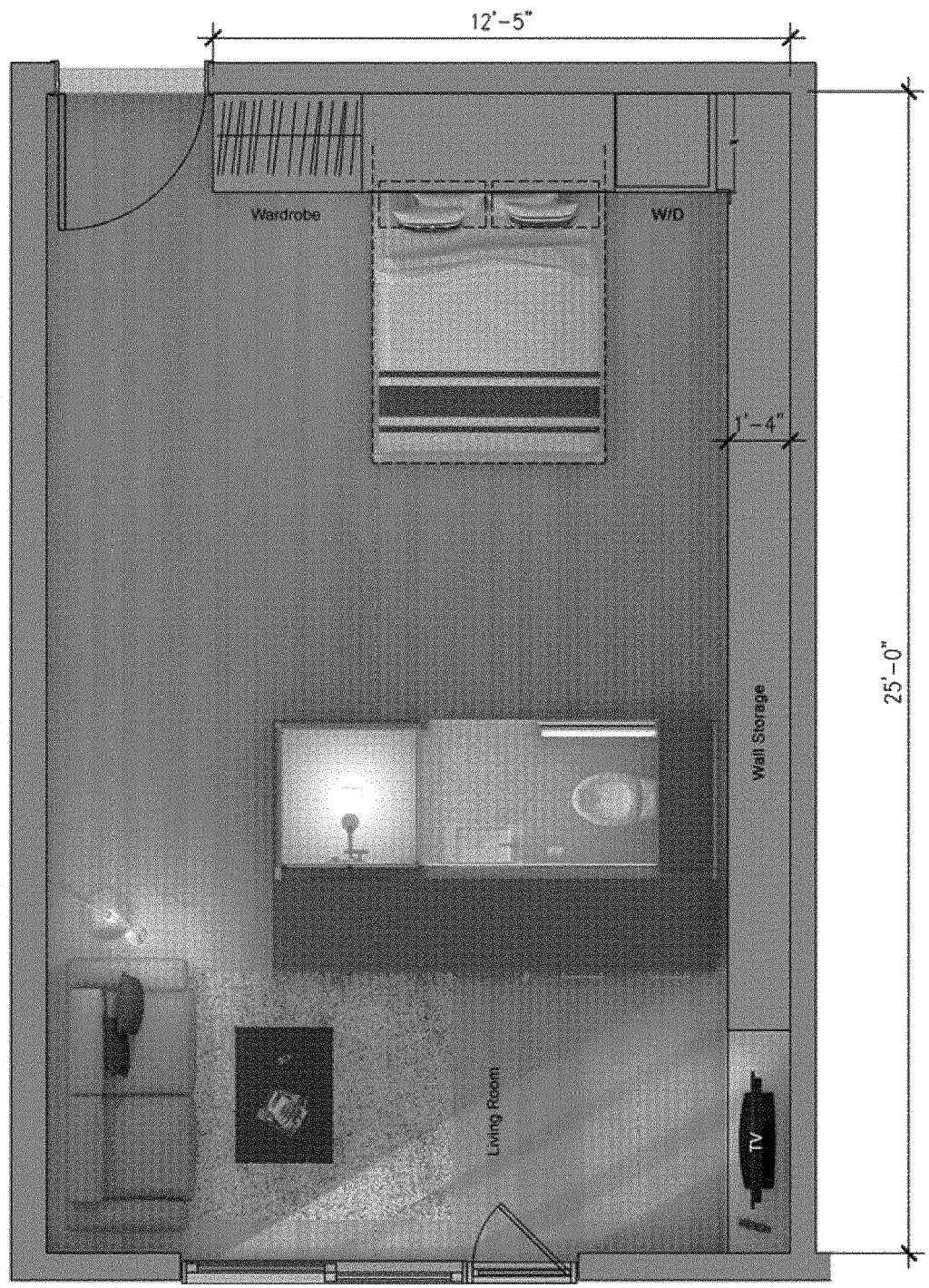
Figure 13:
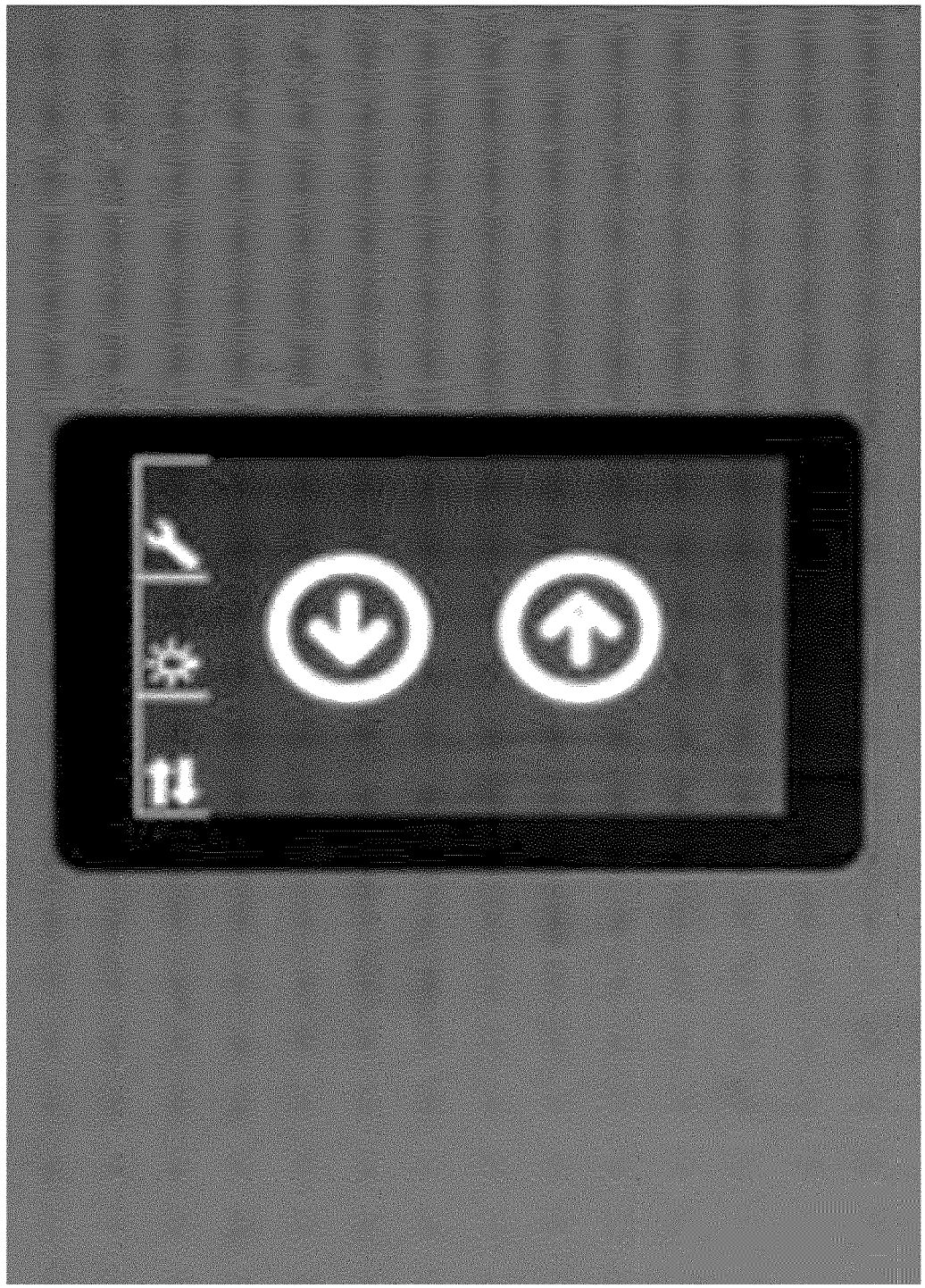
FIG. 13 is a front plan view of a touchscreen of a control panel according to a possible embodiment of the present system.

Concerning the various feed(s) and/or input(s), the module is preferably displaced about the floor area (i.e. on, over, above, etc.) of the apartment, and thus, certain connections, for example, water, electricity, sanitary return, venting, air extraction, etc., are done by mobile connections. By using an articulated connection carrier, for example, as exemplified in FIGS. 1 and 2, it is possible to displace the module, and it also enables for all the services to be completely functional irrespectively of the position of the module within the dwelling. The positioning of this connection carrier may come in various shapes and forms, and various other embodiments, as can be easily understood by a person skilled in the art. According to a possible embodiment, one of the extremities of the connection carrier is operatively affixed to the module and displaces itself with it, whereas the other extremity can be operatively fixed, and enables the connections of all the services to the remaining building.

Concerning the mechanical room, it may include a sanitary tank which receives all the used waters of all the equipments necessitating a return towards the gutters, such as for example, shower, sink, wash basin, toilet, dishwasher, washing machines, etc. With the aid of a level sensor, a submersible pump which may be present within the inside of the sanitary tank, can evacuate black water by means of flexible hoses, which themselves can extend through the articulated connection carrier through the urban infrastructure, as can be easily understood when referring to FIGS. 1 and 2.

Concerning controls and security, it is worth mentioning that presence sensors can be strategically installed within the present system, enabling the management of water and the displacement of the module. Each of the equipments requiring an input in water can be, for example, individually managed, so that in doing so, water cannot be used unless a given user is present in proximity of a corresponding equipment requiring such water feed. This type of system is advantageous in that it can prevent or at the very least minimize water damages, etc. The presence of sensors according to the present system also enables the detection of obstacles, thereby ensuring or at least minimizing any undesirable interaction between two components that are not meant to interact (i.e. contact, collision, etc.) between one another, thereby ensuring the protection of the goods and of the users of the present system.

The displacement and the installation of the module could also be designed so as to be limited in speed, thereby enabling the protection of equipments, accessories of the users of the present system, etc.

Concerning the assemblies, and according to a possible embodiment, all the subassemblies and equipments of the module can connect to one another by means of mechanical connectors and/or links. These mechanical links can facilitate the mounting and dismounting of the corresponding systems.

According to other possible embodiments of the present system, the module may be installed on various types of constructions, and various types of coverings. Preferably, it is better if these types of coverings of the floors are smooth, levelled, and regular, although any proper cooperation and/or different interaction(s) between the module and corresponding floor of the dwelling could be envisioned according to the present system. Example of possible types of constructions could be wood structures (ex. floors, supports, etc.), steel structures and/or concrete structures, whereas possible types of floor coverings can consist of hardwood floors, concrete floors and/or floors made of epoxy covering, for example.

Concerning the displacement and the guiding of the present system, it is worth mentioning that several other mechanisms could also be possible to carry out a corresponding displacement of the module. For example, the displacement could be carried out horizontally along on one or two or several axes. The user can activate this displacement according to particular needs of a given user, or according to available possibilities provided by the given system, etc.

As previously explained, different mechanisms could be used for the displacement assembly, such as wheels, for example, and the displacement could be carried out on wheels by means of at least one electric motor (and/or other type of motor) which could be controlled by the user via a corresponding control panel and/or remote. The displacement mechanism could also be carried out via a corresponding magnetic field. Alternatively, an air cushion could be generated under the base of the module enabling the rising of the module, thereby reducing the friction and enabling an easy and smooth displacement of the module about the corresponding floor of the dwelling. Alternatively also, the displacement mechanism could be suspended and/or hung from the ceiling, via a corresponding rail and/or other type of mechanism, etc. Alternatively also, the module could be manually displaced directly by a given user.

Concerning the guiding of the present system, and according to a possible embodiment, the guiding is designed so as to ideally ensure a linear displacement and also, is preferably designed so as to act as an anti-tipping mechanism, as a way of protecting against seismic activity, such as earthquakes and the like. The guiding in a possible and most simplest embodiment, could be carried out by means of a rail which could be fixed either on the roof, to the wall and/or on the floor, and/or combination thereof.

Concerning sustainable development, in regards to the present system, it is worth mentioning that by assembling, several and/or most of the components of the present system in a factory, it is much easier to coordinate purchases and to reduce losses of materials, etc. Furthermore, the module being preferably designed so as to be completely mountable and dismountable without breaking of any materials, it is possible to recuperate the whole module in its entirety, and/or to reuse it in a different location and/or corresponding dwelling, etc.

The majority of the work is preferably meant to be carried out in a given place, thereby also reducing greatly the displacements of workers and of materials, thereby reducing the use of motorized means of transportation, corresponding fuel consumption and/or resulting pollution, etc.

Concerning savings, it is worth mentioning that with respect to water, for example, the management of water with the electrical valves of the present system can greatly reduce the consumption of water. For example, according to a given possible embodiment of the present system, one must absolutely require that the user be present in front of the given equipment to be used, otherwise, it will be impossible to have water provided to the equipment. Various types of mechanisms (ex. faucets, controls, controllers, reducers, etc.) limiting the debit of water could also be installed on some or several, or all of the equipments, thereby also reducing greatly the overall consumption within the dwelling.

Concerning the installation, the systems are preferably dimensioned so as to facilitate transportation and the speed of installation according to a standard context of access to the building.

As may now better be appreciated, the present invention is a substantial improvement over the known prior art in that, by virtue of its design and components, as explained herein, and the particular configuration of the MoveHome™ concept and/or components/accessories thereof according to the present system, it enables to provide dwellings for people, in a quicker, easier, simpler, faster, more efficient, more economical, more reliable, more adjustable, more versatile, more adaptable, more environmentally-friendly, more sustainable and/or more desirable manner than what is possible with respect to other known conventional dwelling concepts, etc.

Indeed, and for example, the present dwelling system is advantageous in that it enables a user thereof to change his/her own living space(s) to meet specific changing needs.

More particularly, the present dwelling system is an innovative design that breaks new grounds, in that, the Move Home concept offers a new way of life for people who value flexibility, innovation, and sustainable development, all while lowering construction-related costs.

Regarding a maximizing of space, the present system is also very advantageous in that with Move Home, any room can quickly be transformed to meet space-use needs.

Installation is also greatly facilitated, in that, as explained hereinabove, units are meant to pre-assembled at the factory. Therefore, and dimensionally speaking, they are meant to be designed to fit easily through a front door, an elevator door, etc.

Sustainable development is also at the forefront of the present Move Home concept. Indeed, the present dwelling system offers the possibility of a modular design which minimizes waste during construction and does not generate any considerable waste during its fabrication since it is meant to be "factory-made", prior to installation, etc.

The present dwelling system is also advantageous in that if offers a module, grouping together building amenities, into a mobile unit that is "dynamic" and "adjustable", in that, it can be moved linearly at the tenant's/owner's desire, allowing them to take full advantage of the living spaces, options, etc.

The present system is also advantageous in that it offers a design and/or a product that provides maximum comfort in a minimum amount of space while contributing to sustainable development using reusable materials with a focus on comfort and quality of life. Indeed, the present system is meant to be a very desirable choice option for flexible interior design layouts. The present system and/or associated aspects/components thereof are also meant to be made for modern life with mobility solutions that maximize the potential of small residential and commercial spaces.

Indeed, Move Home's high technology units group together building amenities and provide enhanced flexibility in the way indoor spaces are thought out. Designed with sustainable development in mind, the associated innovative module(s) and corresponding unit(s) are meant to be factory-built, which significantly lowers construction-related costs. A corresponding manufacturing plant may also be provided with the present concept, so as to be equipped with state-of-the-art technology that would ensure short lead times and superior products.

As previously explained, the Move Home design is quite innovative compared to traditional dwellings, in that it provides a mobile platform (and/or "module"), that can be moved inside a living space to meet a user's needs, whether it is making a bedroom or the kitchen and living room area(s) bigger and/or smaller, if so desired.

The module features all the basic equipment found in an autonomous living space, including a full kitchen and a bathroom with toilet, sink, and shower. The overall design can also include an entry closet, a wall bed, a laundry cupboard that can accommodate a stackable washer and dryer, and, behind the sliding module, a large wall of built-in storage cupboards.

As previously explained also, the present dwelling system can be provided with automatic protection devices. Thus, the module and/or other parts of the dwelling can incorporate automatic protection devices that significantly lower the risks of water damage and excess energy consumption.

The present dwelling system is also meant to provide a safe configuration, in that the safe reconfiguration of the living space is ensured with a touchscreen (ex. a centralized touchscreen, on a side of the diving module, for example) which can be connected to a micro-computer which coordinates the movement of the module, for example. To activate the shift mechanism, the user can press on corresponding movement arrow(s) on the screen. If one of the sensors detects a presence in the kitchen or bathroom, it can prevent the module from moving.

The present dwelling system is also advantageous in that it provides flexibility and functionality. Indeed, Move Home is an ideal solution for maximizing open-concept loft and studio spaces measuring from about 300 sq. ft. to about 450 sq. ft. (i.e. about 28 to 42 m$^2$).

The present dwelling system is also advantageous in that it provides customization to a user's specific needs. Thus, in a spirit of sustainable development, the replacement of parts is simple, and the recovery system will facilitate end-of-life management. Also, on one can customize the diving module by choosing from different storage options and/or different finishes and colours.

The present dwelling system is also advantageous in that it provides an ecological design. Indeed, Move Home offers a selection of designs that lower their environmental footprint by favoring easy disassembly and part replacement. The present dwelling design aims to make the most of a living space.

Several other advantages, for a consumer, a builder and/or a real estate promoter, also result from employing the present Move Home dwelling system, some of which are exemplified as follows: a) up to 160 sq. ft. of living space giving great flexibility of layout; b) greater acoustic performance and/or greater quality of life; c) greater accessibility with first-time buyers; d) sustainable development: possibility to build about 33% more units per floor surface; e) simplified project management for builders; f) etc.

Other examples of possible advantages for consumers of the present Move Home dwelling system are the following: a) major savings: the Move Home concept will let you save up to 160 ft2 (15 m2) on the size of the apartment; b) great flexibility of layout; c) in a 25'×16', it gives a 16'×16' living room or a 15'×16' bedroom (wall-to-wall); d) superior storage options than other larger residential spaces; e) possibility to configure an office space; f) greater acoustic performance, in that, for example, no water distribution of sewage lines passes through the floor; g) greater quality of life; h) savings on insurance, in that the present dwelling system is energy-efficient and safe; i) etc.

Other examples of possible advantages for builders of the present Move Home dwelling system are the following: a) possibility to build about 33% more units per floor surface. e.g., 6 units of 580 sq. ft.=8 Move Home units of 420 sq. ft.; b) added value to units—far more to offer to consumers; c) quick and independent sale of units; d) base building: no need to worry about where drains are positioned, etc.—one just needs one water inlet from a drain stack on one wall and/or the power inlet; e) less time spent on managing contractors; f) savings on time: installation can be done within days; g) peace of mind: the motion sensors can block the water inlet in the absence of occupants; h) substantial savings regarding construction warranty management; i) savings on insurance, in that the present dwelling system is energy-efficient and safe; j) savings on costs: cabinets, electrical and plumbing are preferably factory-built, etc.; h) substantial savings on waste production and management (LEED); k) some municipalities require permits to install dumpsters—this results in delays, and additional costs, on top of the costs for renting the dumpsters, something that can be avoided and/or minimized when using the present dwelling system; l) etc.

Although not limited to the following examples, the present Move Home dwelling system is particularly advantageous for the following markets: a) new constructions with many units (condos and/or rental units); b) condos located in lodging centers; c) renovation: conversion of large existing units into many small and more efficient Move Home spaces; d) tiny houses, cottages, etc.; e) commercial: Move Home can also be used in the development of hotel condos, more specifically for corporate suites, etc.

As previous explained, Move Home's unique design consists of a mobile platform—a module—that can be moved across a living space to meet your needs, whether it is making a bedroom or the kitchen and living room area bigger, etc. For a particular possible embodiment, such as in a 16' wide apartment (for example), the size of the module can be 9'-6" long, 5'-4" wide and 7'-6" tall (all measures are given as approximate and non-limiting values).

As also previously explained, the module features all the basic equipment found in an autonomous living space, including a full kitchen and a bathroom with toilet, sink, and shower. The global design can also include an entry closet, a wall bed, a laundry cupboard that can accommodate a stackable washer and dryer, and, behind the sliding module, a large wall of built-in storage cupboards.

The present Move Home dwelling system is also advantageous in that it provides for a flexible living space. Indeed, the possibility to move the dividing module allows for greater flexibility. For instance, it is possible to reclaim the bedroom space, which is not used during the day, in order to add it to the kitchen and living area, as needed, to welcome guests, install a large table, work out, dance, etc. The opposite is also true: a user can reclaim the living area space to enlarge the bedroom area.

One can, therefore, get a 15' (4.6 m) bedroom or a 16' long (4.9 m) kitchen and living area by moving the module. Advantageously also, the space between the module and the ceiling allows natural light to pass through and gives depth to the area, which wouldn't be the case with traditional floor to ceiling partition walls.

The present Move Home dwelling system is also advantageous in that the integrity of the building is preserved. The module and/or other aspects/components of the dwelling can come with electronic valves activated by presence sensors at each point of water consumption. These sensors can provide access to domestic water as needed and can block water passage after use to prevent accidental water damage, for example. This innovative feature alone provides substantial savings in home insurance, and is also greatly beneficial from an environmental point-of-view.

The present Move Home dwelling system is also advantageous in that it provides infrastructure benefits. Indeed, the above-described units can be factory built, then delivered and installed onsite in only a few days by a team of certified experts. A contractor will therefore only need to deal with one supplier, namely that of the present Move Home dwelling system. Indeed, the present system offers simplified construction, in that the builder only needs to provide a base building.

For example, the mechanical infrastructure can consist of a mechanical well comprising a waste stack pipe and water service pipe on which the equipment of the module is directly connected. Using a dwelling system such as Move Home also means obtaining shorter timelines on the mechanics of the building and the interior finishing.

The present Move Home dwelling system is also advantageous in that it provides reduced implementation costs. Since there is less traffic on the site, this results in reduced noise and downtime for the surrounding areas.

The present Move Home dwelling system is also advantageous in that it is meant to provide a sturdy movement mechanism. A multitude of cycling and resistance tests have been carried out to ensure the long-term durability of the product. All the devices and parts used in the composition of our movement mechanisms are meant to be selected from highly reliable mechanical engineering components. The same process is applied for selecting the pumps and other mechanisms. The present Move Home dwelling system may also come with a corresponding warranty (ex. 5-year warranty, etc.) against manufacturing defects on the module as well as for all storage units.

Of course, and as can be easily understood by a person skilled in the art, the scope of the above-mentioned numbered paragraphs should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as also apparent to a person skilled in the art.

The invention claimed is:

1. A dwelling for accommodating users, the dwelling comprising:
    a floor surface;
    at least one side wall provided with respect to the floor surface;
    at least one dividing module provided with respect to the floor surface for separating the floor surface into at least two separate living spaces, the at least one dividing module being selectively adjustable in position with respect to the floor surface for providing the dwelling with selectively adjustable living spaces;
    a displacement assembly operatively connectable to the at least one dividing module for displacing said at least one dividing module about the floor surface of the dwelling; and
    a controlling assembly operatively disposed between the at least one dividing module and the displacement assembly for allowing a user of the dwelling to selectively and adjustably position the at least one dividing module with respect to the floor surface of the dwelling, and in turn to selectively and adjustably vary a corresponding layout of the two separate living spaces delimited by the at least one dividing module, in response to a given input of the user and depending on a desired configuration by said user of the dwelling;
    wherein the at least one dividing module is configured for displacement along at least one degree-of-freedom, said at least one degree-of-freedom being configured for enabling the at least one dividing module to carry out at least one corresponding movement selected from the group consisting of a translational movement, a radial movement, a pivotal movement, a rotational movement, a tilting movement, and an arching movement;
    wherein the at least one dividing module comprises a mobile base being displaceable with respect to the floor surface;

wherein the at least one dividing module comprises a wheeled base;

wherein the at least one dividing module is configured to move horizontally about the floor surface of the dwelling along at least one substantially rectilinear direction;

wherein the at least one dividing module is configured to move front and back, and vice-versa;

wherein the dwelling comprises at least one unit selected from the group consisting of a kitchen unit, a bathroom unit, a shower unit, a closet unit, and a storage unit, said at least one unit being contained about the at least one dividing module, and thus, said at least one unit being selectively displaceable with respect to the floor surface of the dwelling via a corresponding displacement of said at least one dividing module;

wherein the at least one dividing module comprises a plurality of the at least one unit, including both the kitchen and bathroom units, and thus, said plurality of the at least one unit being all selectively displaceable together at once with respect to the floor surface of the dwelling via a single corresponding displacement of the at least one dividing module;

wherein the kitchen unit is provided on one side of the at least one dividing module facing a first living space of the dwelling, and wherein the bathroom unit is provided on an opposite side of the at least one dividing module facing a second living space of the dwelling;

wherein the kitchen unit includes at least one appliance selected from the group consisting of an oven, a stovetop, an air extractor, a microwave, a faucet-and-sink assembly, a dishwasher, a refrigerator, and a freezer;

wherein the bathroom unit includes at least one utility service selected from the group consisting of a toilet, a faucet-and-sink assembly, a bathtub, a shower, and a dehumidifier;

wherein the at least one dividing module comprises a submersible pump;

wherein each of the plurality of the at least one unit of the at least one dividing module is prefabricated; wherein unassembled components of each of at least one unit are shaped and sized to fit through a corresponding standard-sized door of the dwelling;

wherein the dwelling includes at least one inner plumbing connection being operatively connectable to at least one outer plumbing connection provided outside of the dwelling;

wherein the dwelling includes at least one inner electrical connection being operatively connectable to at least one outer electrical connection provided outside of the dwelling;

wherein the dwelling includes at least one inner venting connection being operatively connectable to at least one outer venting connection provided outside of the dwelling;

wherein at least one corresponding inner connection of the dwelling is provided about the at least one dividing module;

wherein said at least one corresponding inner connection of the dwelling is operatively connected to at least one corresponding unit of the kitchen and bathroom units contained within the at least one dividing module;

wherein the dwelling comprises a connection carrier for carrying at least one inner utility connection of the dwelling to at least one corresponding outer utility connection of the dwelling;

wherein the connection carrier is a flexible connection carrier having a moveable first end operatively connectable to at least one inner utility connection of the at least one dividing module, and a second end being substantially fixed and operatively connectable to at least one corresponding outer utility connection of the dwelling;

wherein the connection carrier is configured for preventing a bending of the at least one inner utility connection beyond a minimal radius of curvature;

wherein the connection carrier is an articulated connection carrier including a plurality of links;

wherein the connection carrier includes a pair of elongated chains defining a space thereinbetween through which the at least one inner utility connection is allowed to pass and bend;

wherein the connection carrier includes bridging links interconnecting the pair of elongated chains for containing the at least one inner utility connection within the connection carrier;

wherein the connection carrier includes a chain flex;

wherein a first portion of the connection carrier is extendable along a corresponding supporting component of the dwelling, and wherein a second portion of the connection carrier is bendable and moveable over said first portion of the connection carrier;

wherein the floor surface of the dwelling is a substantially rectangular floor surface about which the at least one dividing module is selectively displaceable;

wherein the substantially rectangular floor surface of the dwelling is defined by a pair of longitudinal side walls, and a pair of end walls;

wherein the at least one dividing module is configured to be selectively displaceable about at least one pre-determined operative area of the floor surface;

wherein the at least one pre-determined operative area of the floor surface is adjustable, and programmable via a corresponding control panel of the dwelling;

wherein the dwelling comprises positioning sensors for delimiting movement of the at least one dividing module within the at least one pre-determined operative area of the floor surface;

wherein the positioning sensors of the dwelling are further configured for sensing a positioning of a user or an object within the at least one pre-determined operative area of the floor surface, and for stopping movement of the at least one dividing module accordingly, upon detection of a given condition; and wherein the positioning sensors of the dwelling are further configured for sensing positioning of a user in proximity of a given unit of the dwelling, and for allowing operation of said given unit only upon detecting proximity of the user with respect to said given unit.

2. A dwelling according to claim 1, wherein the at least one dividing module is further configured to prevent operating capability of the given unit when presence of a user is not detected in proximity of said given unit.

3. A dwelling according to claim 2, wherein plumbing operation of a given unit is controlled via at least one corresponding electrical valve being in communication with a corresponding positioning sensor of the dwelling.

4. A dwelling according to claim 3, wherein electrical operation of a given unit is controlled via at least one corresponding electrical switch being in communication with a corresponding positioning sensor of the dwelling.

5. A dwelling according to claim 4, wherein venting operation of a given unit is controlled via at least one corresponding electrical valve being in communication with a corresponding positioning sensor of the dwelling.

6. A dwelling according to claim 5, wherein a corresponding operation of a given unit is controlled via at least one corresponding switch upon detection of an undesirable condition within the dwelling.

7. A dwelling according to claim 6, wherein the dwelling comprises different environment sensors for detecting different parameters within the dwelling, these environment sensors being connected to corresponding controls within the dwelling for modifying the parameters accordingly based on pre-established conditions being selectively set by a user via a corresponding control panel of the dwelling;
 wherein the displacement assembly comprises at least one wheel;
 wherein the at least one dividing module and corresponding at least one wheel are configured for manual operation by a corresponding user of the dwelling; and
 wherein the at least one wheel is driven by at least one corresponding motor.

8. A dwelling according to claim 1, wherein the displacement assembly includes a hanging assembly for hanging the at least one dividing module from a ceiling of the dwelling.

9. A dwelling according to claim 8, wherein the at least one dividing module and corresponding hanging assembly thereof are configured for manual operation by a corresponding user of the dwelling;
 wherein the at least one dividing module and corresponding hanging assembly thereof are electrically operated by at least one corresponding motor and corresponding circuit;
 wherein the displacement assembly and associated components thereof are selectively controlled via a control panel of the dwelling; and
 wherein the at least one dividing module is configured for being selectively adjustable with respect to the floor surface of the dwelling via a corresponding path.

10. A dwelling according to claim 9, wherein the corresponding path is provided along a corresponding side wall of the dwelling.

11. A dwelling according to claim 9, wherein the corresponding path is provided along a corresponding floor surface of the dwelling; and
 wherein the corresponding path is provided along a corresponding ceiling surface of the dwelling.

12. A dwelling according to claim 9, wherein the corresponding path is further configured for preventing the at least one dividing module from tipping over during seismic activity; and
 wherein the dwelling comprises at least one first living area provided on one side of the at least one dividing module, and at one second living area provided on the other side of the at least one dividing module.

13. A dwelling according to claim 1, wherein
a plurality of components of the at least one dividing module are made from injection molding.

14. A dwelling for accommodating users, the dwelling comprising:
 a floor surface;
 at least one side wall provided with respect to the floor surface;
 at least one dividing module provided with respect to the floor surface for separating the floor surface into at least two separate living spaces, the at least one dividing module being selectively adjustable in position with respect to the floor surface for providing the dwelling with selectively adjustable living spaces;
 a displacement assembly operatively connectable to the at least one dividing module for displacing said at least one dividing module about the floor surface of the dwelling; and
 a controlling assembly operatively disposed between the at least one dividing module and the displacement assembly for allowing a user of the dwelling to selectively and adjustably position the at least one dividing module with respect to the floor surface of the dwelling, and in turn to selectively and adjustably vary a corresponding layout of the two separate living spaces delimited by the at least one dividing module, in response to a given input of the user and depending on a desired configuration by said user of the dwelling;
 wherein the at least one dividing module is configured for displacement along at least one degree-of-freedom, said at least one degree-of-freedom being configured for enabling the at least one dividing module to carry out at least one corresponding movement selected from the group consisting of a translational movement, a radial movement, a pivotal movement, a rotational movement, a tilting movement, and an arching movement;
 wherein the at least one dividing module comprises a mobile base being displaceable with respect to the floor surface;
 wherein the at least one dividing module comprises a wheeled base;
 wherein the at least one dividing module is configured to move horizontally about the floor surface of the dwelling along at least one substantially rectilinear direction;
 wherein the at least one dividing module is configured to move front and back, and vice-versa;
 wherein the dwelling comprises at least one unit selected from the group consisting of a kitchen unit, a bathroom unit, a shower unit, a closet unit, and a storage unit, said at least one unit being contained about the at least one dividing module, and thus, said at least one unit being selectively displaceable with respect to the floor surface of the dwelling via a corresponding displacement of said at least one dividing module;
 wherein the at least one dividing module comprises a plurality of the at least one unit, including both the kitchen and bathroom units, and thus, said plurality of the at least one unit being all selectively displaceable together at once with respect to the floor surface of the dwelling via a single corresponding displacement of the at least one dividing module;
 wherein the kitchen unit is provided on one side of the at least one dividing module facing a first living space of the dwelling, and wherein the bathroom unit is provided on an opposite side of the at least one dividing module facing a second living space of the dwelling;
 wherein the kitchen unit includes at least one appliance selected from the group consisting of an oven, a stovetop, an air extractor, a microwave, a faucet-and-sink assembly, a dishwasher, a refrigerator, and a freezer;
 wherein the bathroom unit includes at least one utility service selected from the group consisting of a toilet, a faucet-and-sink assembly, a bathtub, a shower, and a dehumidifier;
 wherein the at least one dividing module comprises a submersible pump;
 wherein each of the plurality of the at least one unit of the at least one dividing module is prefabricated; wherein unassembled components of each of at least one unit are shaped and sized to fit through a corresponding standard-sized door of the dwelling;

wherein the dwelling includes at least one inner plumbing connection being operatively connectable to at least one outer plumbing connection provided outside of the dwelling;

wherein the dwelling includes at least one inner electrical connection being operatively connectable to at least one outer electrical connection provided outside of the dwelling;

wherein the dwelling includes at least one inner venting connection being operatively connectable to at least one outer venting connection provided outside of the dwelling;

wherein at least one corresponding inner connection of the dwelling is provided about the at least one dividing module;

wherein said at least one corresponding inner connection of the dwelling is operatively connected to at least one corresponding unit of the kitchen and bathroom units contained within the at least one dividing module;

wherein the dwelling comprises a connection carrier for carrying at least one inner utility connection of the dwelling to at least one corresponding outer utility connection of the dwelling;

wherein the connection carrier is a flexible connection carrier having a moveable first end operatively connectable to at least one inner utility connection of the at least one dividing module, and a second end being substantially fixed and operatively connectable to at least one corresponding outer utility connection of the dwelling;

wherein the connection carrier is configured for preventing a bending of the at least one inner utility connection beyond a minimal radius of curvature;

wherein the connection carrier is an articulated connection carrier including a plurality of links;

wherein the connection carrier includes a pair of elongated chains defining a space therebetween through which the at least one inner utility connection is allowed to pass and bend;

wherein the connection carrier includes bridging links interconnecting the pair of elongated chains for containing the at least one inner utility connection within the connection carrier;

wherein the connection carrier includes a chain flex;

wherein a first portion of the connection carrier is extendable along a corresponding supporting component of the dwelling, and wherein a second portion of the connection carrier is bendable and moveable over said first portion of the connection carrier;

wherein the floor surface of the dwelling is a substantially rectangular floor surface about which the at least one dividing module is selectively displaceable;

wherein the substantially rectangular floor surface of the dwelling is defined by a pair of longitudinal side walls, and a pair of end walls;

wherein the at least one dividing module is configured to be selectively displaceable about at least one pre-determined operative area of the floor surface;

wherein the at least one pre-determined operative area of the floor surface is adjustable, and programmable via a corresponding control panel of the dwelling;

wherein the dwelling comprises positioning sensors for delimiting movement of the at least one dividing module within the at least one pre-determined operative area of the floor surface;

wherein the positioning sensors of the dwelling are further configured for sensing a positioning of a user or an object within the at least one pre-determined operative area of the floor surface, and for stopping movement of the at least one dividing module accordingly, upon detection of a given condition; and wherein the positioning sensors of the dwelling are further configured for sensing positioning of a user in proximity of a given unit of the dwelling, and for allowing operation of said given unit only upon detecting proximity of the user with respect to said given unit;

wherein the at least one dividing module is further configured to prevent operating capability of the given unit when presence of a user is not detected in proximity of said given unit;

wherein plumbing operation of a given unit is controlled via at least one corresponding electrical valve being in communication with a corresponding positioning sensor of the dwelling;

wherein electrical operation of a given unit is controlled via at least one corresponding electrical switch being in communication with a corresponding positioning sensor of the dwelling;

wherein venting operation of a given unit is controlled via at least one corresponding electrical valve being in communication with a corresponding positioning sensor of the dwelling;

wherein a corresponding operation of a given unit is controlled via at least one corresponding switch upon detection of an undesirable condition within the dwelling;

wherein the dwelling comprises different environment sensors for detecting different parameters within the dwelling, these environment sensors being connected to corresponding controls within the dwelling for modifying the parameters accordingly based on pre-established conditions being selectively set by a user via a corresponding control panel of the dwelling;

wherein the displacement assembly comprises at least one wheel;

wherein the at least one dividing module and corresponding at least one wheel are configured for manual operation by a corresponding user of the dwelling; and wherein the at least one wheel is driven by at least one corresponding motor, wherein the displacement assembly includes a hanging assembly for hanging the at least one dividing module from a ceiling of the dwelling;

wherein the at least one dividing module and corresponding hanging assembly thereof are configured for manual operation by a corresponding user of the dwelling;

wherein the at least one dividing module and corresponding hanging assembly thereof are electrically operated by at least one corresponding motor and corresponding circuit;

wherein the displacement assembly and associated components thereof are selectively controlled via a control panel of the dwelling;

wherein the at least one dividing module is configured for being selectively adjustable with respect to the floor surface of the dwelling via a corresponding path, wherein the corresponding path is provided along a corresponding side wall of the dwelling;

wherein the corresponding path is provided along a corresponding floor surface of the dwelling;

wherein the corresponding path is provided along a corresponding ceiling surface of the dwelling;

wherein the corresponding path is further configured for preventing the at least one dividing module from tipping over during seismic activity; and wherein the dwelling comprises at least one first living area provided on one side of the at least one dividing module, and at one second living area provided on the other side of the at least one dividing module.

\* \* \* \* \*